US012578307B2

(12) United States Patent
Giles et al.

(10) Patent No.: US 12,578,307 B2
(45) Date of Patent: Mar. 17, 2026

(54) DE-CLUSTERING ION GUIDE

(71) Applicant: Micromass UK Limited, Wilmslow (GB)

(72) Inventors: Kevin Giles, Stockport (GB); Jakub Ujma, Manchester (GB)

(73) Assignee: Micromass UK Limited, Wilmslow (GB)

( * ) Notice: Subject to any disclaimer, the term of this patent is extended or adjusted under 35 U.S.C. 154(b) by 509 days.

(21) Appl. No.: 17/916,930

(22) PCT Filed: Mar. 31, 2021

(86) PCT No.: PCT/GB2021/050807
§ 371 (c)(1),
(2) Date: Oct. 4, 2022

(87) PCT Pub. No.: WO2021/198689
PCT Pub. Date: Oct. 7, 2021

(65) Prior Publication Data
US 2023/0152277 A1 May 18, 2023

(30) Foreign Application Priority Data

Apr. 3, 2020 (GB) ..................................... 2004961

(51) Int. Cl.
*G01N 27/623* (2021.01)
*H01J 49/06* (2006.01)
*H01J 49/24* (2006.01)

(52) U.S. Cl.
CPC .......... *G01N 27/623* (2021.01); *H01J 49/062* (2013.01); *H01J 49/24* (2013.01)

(58) Field of Classification Search
CPC .. G01N 27/622; G01N 27/623; G01N 27/624; H01J 49/0045; H01J 49/062;
(Continued)

(56) References Cited

U.S. PATENT DOCUMENTS 5,495,108 A 2/1996 Apffel, Jr. et al.
5,750,988 A 5/1998 Apffel et al.
(Continued)

FOREIGN PATENT DOCUMENTS

DE 202005001632 U1 6/2005
DE 102004061821 B4 4/2010
(Continued)

OTHER PUBLICATIONS

International Search Report and Written Opinion for International Application No. PCT/GB2021/050807, mailed Jun. 24, 2021.
(Continued)

*Primary Examiner* — Michael J Logie
*Assistant Examiner* — Hsien C Tsai
(74) *Attorney, Agent, or Firm* — Goodwin Procter LLP

(57) ABSTRACT

A method of mass and/or ion mobility spectrometry comprising: providing an ion guide comprising a plurality of electrodes and having a background gas therein; applying an RF voltage to electrodes of the ion guide for radially confining ions therein; transmitting clusters of analyte ions and adduct species into the ion guide; applying, in a first mode, one or more AC voltage to the ion guide so as to oscillate the clusters such that they collide with molecules of the background gas and cause adduct species in the clusters to detach from the analyte ions, wherein the one or more AC voltage has a different amplitude and/or frequency to that of said RF voltage; and (i) varying the speed with which the clusters are urged along the ion guide during the first mode; and/or (ii) varying the amplitude and/or frequency of the one or more AC voltage as the clusters travel along the ion guide.

20 Claims, 16 Drawing Sheets

(58) Field of Classification Search
CPC .... H01J 49/24; H01J 49/0077; H01J 49/0054;
H01J 49/147; H01J 49/165
See application file for complete search history.

(56) References Cited

U.S. PATENT DOCUMENTS

| | | |
|---|---|---|
| RE36,892 E | 10/2000 | Apffel, Jr. et al. |
| 6,278,110 B1 | 8/2001 | Apffel et al. |
| 6,294,779 B1 | 9/2001 | Apffel et al. |
| 6,396,057 B1 | 5/2002 | Jarrell et al. |
| 6,498,343 B2 | 12/2002 | Apffel et al. |
| 6,504,149 B2 | 1/2003 | Guevremont et al. |
| 6,528,784 B1 | 3/2003 | Tang et al. |
| 6,621,077 B1 | 9/2003 | Guevremont et al. |
| 6,627,912 B2 | 9/2003 | Bandura et al. |
| 6,639,212 B1 | 10/2003 | Guevremont et al. |
| 6,639,216 B2 | 10/2003 | Apffel, Jr. et al. |
| 6,653,626 B2 | 11/2003 | Fischer et al. |
| 6,653,627 B2 | 11/2003 | Guevremont et al. |
| 6,657,191 B2 | 12/2003 | Park |
| 6,683,301 B2 | 1/2004 | Whitehouse et al. |
| 6,690,004 B2 | 2/2004 | Miller et al. |
| 6,703,609 B2 | 3/2004 | Guevremont et al. |
| 6,713,758 B2 | 3/2004 | Guevremont et al. |
| 6,753,522 B2 | 6/2004 | Guevremont et al. |
| 6,770,486 B1 | 8/2004 | Griffey et al. |
| 6,770,875 B1 | 8/2004 | Guevremont et al. |
| 6,774,360 B2 | 8/2004 | Guevremont et al. |
| 6,787,765 B2 | 9/2004 | Guevremont et al. |
| 6,797,946 B2 | 9/2004 | Apffel, Jr. et al. |
| 6,799,355 B2 | 10/2004 | Guevremont et al. |
| 6,806,466 B2 | 10/2004 | Guevremont et al. |
| 6,812,459 B2 | 11/2004 | Fischer et al. |
| 6,822,224 B2 | 11/2004 | Guevremont |
| 6,825,461 B2 | 11/2004 | Guevremont et al. |
| 6,831,271 B1 | 12/2004 | Guevremont et al. |
| 6,838,666 B2 | 1/2005 | Ouyang et al. |
| 6,872,941 B1 | 3/2005 | Whitehouse et al. |
| 6,884,995 B2 * | 4/2005 | Bateman ............... H01J 49/062 |
| | | 250/281 |
| 6,917,036 B2 | 7/2005 | Guevremont et al. |
| 6,972,407 B2 | 12/2005 | Miller et al. |
| 6,987,262 B2 | 1/2006 | Guevremont |
| 6,998,608 B2 | 2/2006 | Guevremont et al. |
| 6,998,610 B2 | 2/2006 | Wang |
| 7,002,146 B2 | 2/2006 | Fischer et al. |
| 7,005,633 B2 | 2/2006 | Guevremont et al. |
| 7,019,289 B2 | 3/2006 | Wang |
| 7,026,612 B2 | 4/2006 | Guevremont et al. |
| 7,034,286 B2 | 4/2006 | Guevremont et al. |
| 7,034,289 B2 | 4/2006 | Guevremont et al. |
| 7,091,477 B2 | 8/2006 | Jolliffe et al. |
| 7,098,451 B2 | 8/2006 | Park |
| 7,098,452 B2 | 8/2006 | Schneider et al. |
| 7,189,977 B2 | 3/2007 | Yamaguchi et al. |
| 7,223,967 B2 | 5/2007 | Guevremont et al. |
| 7,250,306 B2 | 7/2007 | Guevremont et al. |
| 7,265,362 B2 | 9/2007 | Bajic et al. |
| 7,294,841 B2 | 11/2007 | Bajic et al. |
| 7,309,859 B2 | 12/2007 | Fischer et al. |
| 7,329,866 B2 | 2/2008 | Wang |
| 7,351,955 B2 | 4/2008 | Kovtoun |
| 7,365,317 B2 | 4/2008 | Whitehouse et al. |
| 7,385,189 B2 | 6/2008 | Goodley et al. |
| 7,397,028 B2 | 7/2008 | Brennen et al. |
| 7,399,961 B2 | 7/2008 | Chen et al. |
| 7,405,401 B2 | 7/2008 | Hoyes |
| 7,411,182 B2 | 8/2008 | Fedorov et al. |
| 7,442,927 B2 | 10/2008 | Fedorov |
| 7,460,225 B2 | 12/2008 | Karanassios |
| 7,462,826 B2 | 12/2008 | Schneider et al. |
| 7,479,630 B2 | 1/2009 | Bandura et al. |
| 7,495,211 B2 | 2/2009 | Franzen et al. |
| 7,518,108 B2 | 4/2009 | Frey et al. |
| 7,528,365 B2 | 5/2009 | Guo et al. |
| 7,638,765 B1 | 12/2009 | Belford et al. |
| 7,659,505 B2 | 2/2010 | Jolliffe et al. |
| 7,687,771 B2 | 3/2010 | Jolliffe et al. |
| 7,696,474 B2 | 4/2010 | Wu |
| 7,705,299 B2 | 4/2010 | Fedorov |
| 7,786,435 B2 | 8/2010 | Whitehouse et al. |
| 7,820,980 B2 | 10/2010 | Balogh |
| 7,872,228 B1 | 1/2011 | Kim et al. |
| 7,880,148 B2 | 2/2011 | Fedorov et al. |
| 7,919,747 B2 | 4/2011 | Green et al. |
| 7,960,694 B2 | 6/2011 | Hoyes |
| 7,973,278 B2 | 7/2011 | Syms |
| 8,008,619 B2 | 8/2011 | Jolliffe et al. |
| 8,026,478 B2 | 9/2011 | Bajic |
| 8,030,610 B2 | 10/2011 | Guo et al. |
| 8,044,348 B2 | 10/2011 | Jolliffe et al. |
| 8,049,169 B2 | 11/2011 | Satake et al. |
| 8,084,736 B2 | 12/2011 | Schneider et al. |
| 8,153,964 B2 | 4/2012 | Chen et al. |
| 8,188,011 B1 | 5/2012 | Griffey et al. |
| 8,227,750 B1 | 7/2012 | Zhu et al. |
| 8,350,212 B2 | 1/2013 | Covey et al. |
| 8,384,023 B2 | 2/2013 | Schultz et al. |
| 8,389,933 B2 | 3/2013 | Hoyes |
| 8,399,826 B2 | 3/2013 | Hager et al. |
| 8,455,819 B2 | 6/2013 | Green et al. |
| 8,481,927 B2 | 7/2013 | Franzen et al. |
| 8,481,928 B2 | 7/2013 | Franzen |
| 8,507,848 B1 | 8/2013 | Ding et al. |
| 8,513,600 B2 | 8/2013 | Schneider et al. |
| 8,525,107 B2 | 9/2013 | Bandura et al. |
| 8,558,168 B2 | 10/2013 | Schultz et al. |
| 8,586,917 B2 | 11/2013 | Green et al. |
| 8,633,435 B2 | 1/2014 | Kenny et al. |
| 8,658,969 B2 | 2/2014 | Nishiguchi |
| 8,742,339 B2 | 6/2014 | Hoyes |
| 8,779,356 B2 | 7/2014 | Covey et al. |
| 8,822,915 B2 | 9/2014 | Mukaibatake et al. |
| 8,835,839 B1 | 9/2014 | Anderson et al. |
| 8,901,490 B1 | 12/2014 | Chen et al. |
| 8,907,273 B1 | 12/2014 | Chen et al. |
| 8,927,940 B2 | 1/2015 | Park |
| 8,969,798 B2 | 3/2015 | Park |
| 8,969,800 B1 | 3/2015 | Tolmachev et al. |
| 9,006,647 B2 | 4/2015 | Kenny et al. |
| 9,048,079 B2 | 6/2015 | Krutchinsky et al. |
| 9,082,604 B2 | 7/2015 | Verenchikov |
| 9,129,787 B2 | 9/2015 | Bateman et al. |
| 9,136,098 B2 | 9/2015 | Wildgoose et al. |
| 9,171,711 B2 | 10/2015 | Schneider et al. |
| 9,184,040 B2 | 11/2015 | Park |
| 9,240,310 B2 | 1/2016 | Krutchinsky et al. |
| 9,269,549 B2 | 2/2016 | Green et al. |
| 9,299,548 B2 | 3/2016 | Bonner et al. |
| 9,305,762 B2 | 4/2016 | Covey et al. |
| 9,312,118 B2 | 4/2016 | Hoyes |
| 9,324,548 B1 | 4/2016 | Benter et al. |
| 9,343,284 B1 | 5/2016 | Verenchikov |
| 9,425,035 B2 | 8/2016 | Giles et al. |
| 9,437,398 B2 | 9/2016 | Tomany |
| 9,490,111 B2 | 11/2016 | Abell et al. |
| 9,536,718 B2 | 1/2017 | Robinson et al. |
| 9,589,777 B2 | 3/2017 | Papanastasiou et al. |
| 9,595,431 B2 | 3/2017 | Verenchikov |
| 9,679,752 B2 | 6/2017 | Hoyes |
| 9,683,963 B2 | 6/2017 | Verenchikov |
| 9,768,007 B2 | 9/2017 | Verenchikov |
| 9,768,008 B2 | 9/2017 | Verenchikov |
| 9,786,479 B2 | 10/2017 | Green et al. |
| 9,786,482 B2 | 10/2017 | Verenchikov |
| 9,812,311 B2 | 11/2017 | Anderson et al. |
| 9,881,779 B2 | 1/2018 | Brown |
| 9,881,780 B2 | 1/2018 | Verenchikov et al. |
| 9,916,968 B1 | 3/2018 | Kurulugama et al. |
| 9,947,521 B2 | 4/2018 | Brown et al. |
| 9,952,134 B2 | 4/2018 | Bandura et al. |
| 9,966,244 B2 | 5/2018 | Anderson et al. |
| 10,020,177 B2 | 7/2018 | Bajic et al. |
| 10,026,599 B2 | 7/2018 | Takats et al. |

(56) References Cited

U.S. PATENT DOCUMENTS

| | | | |
|---|---|---|---|
| 10,049,867 B2 | 8/2018 | Verenchikov |
| 10,062,557 B2 | 8/2018 | Kenny |
| 10,090,140 B2 | 10/2018 | Makarov et al. |
| 10,101,335 B2 | 10/2018 | McGee et al. |
| 10,153,148 B2 | 12/2018 | Verenchikov |
| 10,153,149 B2 | 12/2018 | Verenchikov |
| 10,180,386 B2 | 1/2019 | Bandura et al. |
| 10,211,039 B2 | 2/2019 | Verenchikov et al. |
| 10,215,719 B2 | 2/2019 | Kayser |
| 10,217,623 B2 | 2/2019 | Brown et al. |
| 10,224,196 B2 | 3/2019 | Giles et al. |
| 10,236,173 B2 | 3/2019 | Bossmeyer et al. |
| 10,312,069 B2 | 6/2019 | Jarrell |
| 10,325,767 B1 | 6/2019 | Prasad et al. |
| 10,354,855 B2 | 7/2019 | Verenchikov |
| 10,388,500 B2 | 8/2019 | Hoyes |
| 10,436,698 B2 | 10/2019 | Bandura et al. |
| 10,446,380 B2 | 10/2019 | Makarov et al. |
| 10,541,123 B2 | 1/2020 | Verenchikov |
| 10,593,534 B2 | 3/2020 | Verenchikov et al. |
| 10,714,322 B2 | 7/2020 | Makarov et al. |
| 10,741,377 B2 | 8/2020 | Verenchikov et al. |
| 10,741,378 B2 | 8/2020 | Hager |
| 10,777,398 B2 | 9/2020 | Richardson et al. |
| 10,804,088 B1 | 10/2020 | Goodwin et al. |
| 10,811,242 B2 | 10/2020 | Zarrine-Afsar et al. |
| 10,916,415 B2 | 2/2021 | Karancsi et al. |
| 10,955,421 B2 | 3/2021 | Robinson et al. |
| 10,971,346 B2 | 4/2021 | Karancsi et al. |
| 10,978,284 B2 | 4/2021 | Pringle et al. |
| 11,031,222 B2 | 6/2021 | Pringle et al. |
| 11,037,774 B2 | 6/2021 | Pringle et al. |
| 11,094,519 B2 | 8/2021 | Karancsi et al. |
| 11,127,576 B2 | 9/2021 | Brown et al. |
| 11,133,162 B2 | 9/2021 | Makarov et al. |
| 11,139,156 B2 | 10/2021 | Balog et al. |
| 11,164,735 B2 | 11/2021 | Gillig et al. |
| 11,189,475 B2 | 11/2021 | Araki |
| 11,239,066 B2 | 2/2022 | Jones et al. |
| 11,264,223 B2 | 3/2022 | Takats et al. |
| 11,270,876 B2 | 3/2022 | Jones et al. |
| 11,282,688 B2 | 3/2022 | Takats et al. |
| 11,289,320 B2 | 3/2022 | Pringle et al. |
| 11,342,170 B2 | 5/2022 | Karancsi et al. |
| 11,367,605 B2 | 6/2022 | Jones et al. |
| 11,367,606 B2 | 6/2022 | Takats et al. |
| 11,515,136 B2 | 11/2022 | Richardson et al. |
| 11,574,801 B1 | 2/2023 | Campbell |
| 11,574,803 B2 | 2/2023 | Takáts et al. |
| 11,621,154 B2 | 4/2023 | Wamsley et al. |
| 11,710,627 B2 | 7/2023 | Jones et al. |
| 11,764,048 B2 | 9/2023 | Takáts et al. |
| 11,784,036 B2 | 10/2023 | Mavanur et al. |
| 11,864,303 B2 | 1/2024 | Alavi et al. |
| 11,885,810 B2 | 1/2024 | Chorev et al. |
| 12,002,672 B2 | 6/2024 | Collings et al. |
| 12,080,537 B2 | 9/2024 | Makarov et al. |
| 12,100,583 B2 | 9/2024 | Mavanur et al. |
| 12,122,805 B2 | 10/2024 | Robinson et al. |
| 12,315,714 B2 | 5/2025 | Pringle et al. |
| 2003/0089847 A1 | 5/2003 | Guevremont et al. |
| 2003/0146377 A1 | 8/2003 | Miller et al. |
| 2004/0124353 A1 | 7/2004 | Tanner et al. |
| 2004/0206901 A1 | 10/2004 | Chen et al. |
| 2005/0142581 A1 | 6/2005 | Griffey et al. |
| 2005/0218320 A1 | 10/2005 | Guevremont et al. |
| 2006/0118715 A1 | 6/2006 | Schneider et al. |
| 2006/0219891 A1 | 10/2006 | Balogh |
| 2006/0237663 A1 | 10/2006 | Balogh |
| 2007/0164209 A1 | 7/2007 | Balogh |
| 2008/0164409 A1* | 7/2008 | Schultz ............ G01N 27/623 |
| | | 250/288 |
| 2009/0134326 A1 | 5/2009 | Bandura et al. |
| 2009/0261247 A1 | 10/2009 | Cooks et al. |
| 2010/0282966 A1 | 11/2010 | Schneider et al. |
| 2011/0183431 A1 | 7/2011 | Covey et al. |
| 2013/0009050 A1 | 1/2013 | Park |
| 2014/0070092 A1 | 3/2014 | Bandura et al. |
| 2014/0131570 A1 | 5/2014 | Yoshioka et al. |
| 2015/0108347 A1 | 4/2015 | De |
| 2015/0346214 A1 | 12/2015 | Laganowsky et al. |
| 2015/0348769 A1 | 12/2015 | Park |
| 2016/0049286 A1 | 2/2016 | Park |
| 2016/0260594 A1 | 9/2016 | Hendricks |
| 2017/0336356 A1 | 11/2017 | Covey et al. |
| 2018/0246060 A1 | 8/2018 | Nagai |
| 2018/0247804 A1 | 8/2018 | Shelley et al. |
| 2019/0025254 A1 | 1/2019 | Fujita |
| 2019/0094237 A1 | 3/2019 | Hopper et al. |
| 2020/0075301 A1 | 3/2020 | Takáts et al. |
| 2020/0240895 A1 | 7/2020 | Bandura et al. |
| 2021/0272789 A1 | 9/2021 | Pringle et al. |
| 2022/0157589 A1 | 5/2022 | Takáts et al. |
| 2022/0367166 A1 | 11/2022 | Takats et al. |
| 2023/0118135 A1 | 4/2023 | Biesenthal et al. |
| 2023/0152277 A1 | 5/2023 | Giles et al. |
| 2024/0087870 A1 | 3/2024 | Bedford et al. |
| 2024/0128071 A1 | 4/2024 | Takáts et al. |
| 2024/0186132 A1 | 6/2024 | Marriott |
| 2024/0264164 A1 | 8/2024 | Urner et al. |
| 2025/0087475 A1 | 3/2025 | Kudo et al. |
| 2025/0136559 A1 | 5/2025 | Brown et al. |
| 2025/0226199 A1 | 7/2025 | Javahery et al. |

FOREIGN PATENT DOCUMENTS

| | | |
|---|---|---|
| DE | 102005004801 B4 | 6/2010 |
| DE | 102005004804 B4 | 6/2010 |
| DE | 102009037716 B4 | 1/2013 |
| DE | 102009050040 B4 | 10/2014 |
| DE | 112013003813 T5 | 5/2015 |
| DE | 10392706 B4 | 9/2016 |
| DE | 102017108461 A1 | 10/2017 |
| DE | 202016008460 U1 | 1/2018 |
| DE | 102016124889 B4 | 6/2019 |
| DE | 112010005660 B4 | 6/2019 |
| DE | 112014002092 B4 | 10/2021 |
| DE | 202021105394 U1 | 10/2021 |
| DE | 112015001908 B4 | 1/2022 |
| DE | 102016109053 B4 | 5/2023 |
| DE | 112010006135 B3 | 5/2023 |
| DE | 112022001120 T5 | 12/2023 |
| DE | 112015002780 B4 | 5/2024 |
| DE | 112018007357 B4 | 12/2024 |
| DE | 112014007363 B4 | 4/2025 |
| DE | 102017000240 B4 | 5/2025 |
| EP | 0692713 A1 | 1/1996 |
| EP | 1102984 A1 | 5/2001 |
| EP | 1183091 A1 | 3/2002 |
| EP | 1266209 A2 | 12/2002 |
| EP | 1266393 A2 | 12/2002 |
| EP | 1266395 A2 | 12/2002 |
| EP | 1387724 A1 | 2/2004 |
| EP | 1391912 A2 | 2/2004 |
| EP | 1395820 A1 | 3/2004 |
| EP | 1474677 A2 | 11/2004 |
| EP | 1474691 A1 | 11/2004 |
| EP | 1474819 A1 | 11/2004 |
| EP | 1481240 A1 | 12/2004 |
| EP | 1481415 A1 | 12/2004 |
| EP | 1102985 B1 | 10/2005 |
| EP | 1273029 B1 | 10/2005 |
| EP | 1588399 A2 | 10/2005 |
| EP | 1102986 B1 | 11/2005 |
| EP | 1739722 A2 | 1/2007 |
| EP | 1760765 A2 | 3/2007 |
| EP | 1849177 A2 | 10/2007 |
| EP | 1922136 A2 | 5/2008 |
| EP | 1593144 B1 | 11/2009 |
| EP | 1393345 B1 | 2/2010 |
| EP | 1266394 B1 | 3/2010 |
| EP | 1419517 B1 | 4/2010 |
| EP | 1704578 B1 | 4/2011 |
| EP | 1364386 B1 | 12/2011 |

(56)        References Cited

FOREIGN PATENT DOCUMENTS

| | | | |
|---|---|---|---|
| EP | 2498273 | A1 | 9/2012 |
| EP | 1956635 | B1 | 5/2013 |
| EP | 2637195 | A2 | 9/2013 |
| EP | 1905061 | B1 | 3/2014 |
| EP | 2715776 | A2 | 4/2014 |
| EP | 2725351 | A1 | 4/2014 |
| EP | 2729958 | A1 | 5/2014 |
| EP | 1759402 | B1 | 7/2015 |
| EP | 2038913 | B1 | 7/2015 |
| EP | 2912678 | A1 | 9/2015 |
| EP | 2011137 | B1 | 8/2016 |
| EP | 1282910 | B1 | 4/2017 |
| EP | 2715775 | B1 | 8/2017 |
| EP | 1733415 | B1 | 10/2017 |
| EP | 2751829 | B1 | 1/2018 |
| EP | 2513946 | B1 | 2/2018 |
| EP | 3278352 | A1 | 2/2018 |
| EP | 2084732 | B1 | 4/2018 |
| EP | 1982349 | B1 | 7/2018 |
| EP | 2529387 | B1 | 8/2018 |
| EP | 3367089 | A1 | 8/2018 |
| EP | 2013895 | B1 | 9/2018 |
| EP | 2281297 | B1 | 1/2019 |
| EP | 1779408 | B1 | 3/2019 |
| EP | 3469623 | A2 | 4/2019 |
| EP | 2587521 | B1 | 6/2019 |
| EP | 2389681 | B1 | 8/2019 |
| EP | 3265818 | B1 | 2/2020 |
| EP | 3265823 | B1 | 5/2020 |
| EP | 3671216 | A1 | 6/2020 |
| EP | 3265817 | B1 | 8/2020 |
| EP | 3324423 | B1 | 8/2020 |
| EP | 3265819 | B1 | 10/2020 |
| EP | 3741303 | A2 | 11/2020 |
| EP | 3790037 | A1 | 3/2021 |
| EP | 3265822 | B1 | 4/2021 |
| EP | 3800657 | A1 | 4/2021 |
| EP | 3803947 | A1 | 4/2021 |
| EP | 3265821 | B1 | 6/2021 |
| EP | 2621612 | B1 | 1/2022 |
| EP | 2864998 | B1 | 1/2022 |
| EP | 3264990 | B1 | 1/2022 |
| EP | 2984675 | B1 | 3/2022 |
| EP | 3265797 | B1 | 10/2022 |
| EP | 3266037 | B1 | 1/2023 |
| EP | 4128316 | A1 | 2/2023 |
| EP | 4128320 | A1 | 2/2023 |
| EP | 4174906 | A1 | 5/2023 |
| EP | 3266035 | B1 | 9/2023 |
| EP | 4257967 | A2 | 10/2023 |
| EP | 4281995 | A1 | 11/2023 |
| EP | 3264989 | B1 | 12/2023 |
| EP | 3265820 | B1 | 12/2023 |
| EP | 3726562 | B1 | 12/2023 |
| EP | 3570315 | B1 | 1/2024 |
| EP | 4365928 | A2 | 5/2024 |
| EP | 3637454 | B1 | 3/2025 |
| EP | 4609419 | A1 | 9/2025 |
| GB | 2394830 | B | 8/2005 |
| GB | 2406705 | B | 9/2006 |
| GB | 2425399 | B | 3/2007 |
| GB | 2418528 | B | 5/2007 |
| GB | 2410831 | B | 5/2008 |
| GB | 2410830 | B | 6/2008 |
| GB | 2437819 | B | 7/2009 |
| GB | 2429978 | B | 10/2009 |
| GB | 2421632 | B | 12/2009 |
| GB | 2442638 | B | 1/2010 |
| GB | 2440364 | B | 2/2010 |
| GB | 2440613 | B | 4/2010 |
| GB | 2443515 | B | 10/2010 |
| GB | 2455593 | B | 11/2010 |
| GB | 2437829 | B | 12/2010 |
| GB | 2471581 | B | 4/2011 |
| GB | 2476964 | A | 7/2011 |
| GB | 2477007 | A | 7/2011 |
| GB | 2445016 | B | 3/2012 |
| GB | 2441022 | B | 6/2012 |
| GB | 2508574 | B | 12/2014 |
| GB | 2473128 | B | 6/2015 |
| GB | 2499068 | B | 8/2015 |
| GB | 2522801 | A | 8/2015 |
| GB | 2473106 | B | 10/2015 |
| GB | 2493602 | B | 4/2016 |
| GB | 2507297 | B | 6/2017 |
| GB | 2555522 | A | 5/2018 |
| GB | 2556074 | A | 5/2018 |
| GB | 2519007 | B | 9/2018 |
| GB | 2529282 | B | 9/2018 |
| GB | 2532821 | B | 2/2019 |
| GB | 2551926 | B | 10/2019 |
| GB | 2538870 | B | 12/2019 |
| GB | 2538871 | B | 12/2019 |
| GB | 2549248 | B | 7/2020 |
| GB | 2563194 | B | 8/2020 |
| GB | 2552602 | B | 12/2020 |
| GB | 2553941 | B | 2/2021 |
| GB | 2583469 | B | 2/2021 |
| GB | 2551294 | B | 3/2021 |
| GB | 2554206 | B | 3/2021 |
| GB | 2533671 | B | 4/2021 |
| GB | 2551669 | B | 4/2021 |
| GB | 2584972 | B | 4/2021 |
| GB | 2556994 | B | 5/2021 |
| GB | 2585167 | B | 6/2021 |
| GB | 2587288 | B | 7/2021 |
| GB | 2554202 | B | 8/2021 |
| GB | 2558741 | B | 8/2021 |
| GB | 2588861 | B | 8/2021 |
| GB | 2554181 | B | 9/2021 |
| GB | 2555921 | B | 9/2021 |
| GB | 2594421 | A | 10/2021 |
| GB | 2556436 | B | 1/2022 |
| GB | 2554180 | B | 4/2022 |
| GB | 2552430 | B | 5/2022 |
| GB | 2553937 | B | 6/2022 |
| GB | 2598259 | B | 6/2022 |
| GB | 2601954 | A | 6/2022 |
| GB | 2601439 | B | 8/2022 |
| GB | 2601669 | B | 8/2022 |
| GB | 2602212 | B | 9/2022 |
| GB | 2553918 | B | 10/2022 |
| GB | 2574327 | B | 11/2022 |
| GB | 2607198 | A | 11/2022 |
| GB | 2618961 | A | 11/2023 |
| GB | 2597575 | B | 5/2024 |
| GB | 2595560 | B | 10/2024 |
| GB | 2623465 | B | 11/2024 |
| WO | 200008454 | A1 | 2/2000 |
| WO | 200008455 | A1 | 2/2000 |
| WO | 200008456 | A1 | 2/2000 |
| WO | 200008457 | A1 | 2/2000 |
| WO | 2019012367 | A2 | 1/2001 |
| WO | 200158573 | A1 | 8/2001 |
| WO | 200169216 | A2 | 9/2001 |
| WO | 200169217 | A2 | 9/2001 |
| WO | 200169218 | A2 | 9/2001 |
| WO | 200169219 | A2 | 9/2001 |
| WO | 200169220 | A2 | 9/2001 |
| WO | 200169221 | A2 | 9/2001 |
| WO | 200169646 | A2 | 9/2001 |
| WO | 200169647 | A2 | 9/2001 |
| WO | 200180283 | A1 | 10/2001 |
| WO | 2002061798 | A1 | 8/2002 |
| WO | 2002083276 | A1 | 10/2002 |
| WO | 2002086489 | A1 | 10/2002 |
| WO | 2002093148 | A2 | 11/2002 |
| WO | 2003009331 | A2 | 1/2003 |
| WO | 2003067236 | A2 | 8/2003 |
| WO | 2003067237 | A2 | 8/2003 |
| WO | 2003067242 | A1 | 8/2003 |
| WO | 2003067243 | A1 | 8/2003 |
| WO | 2003067244 | A2 | 8/2003 |
| WO | 2003067261 | A1 | 8/2003 |

(56)  References Cited

FOREIGN PATENT DOCUMENTS

| | | | |
|---|---|---|---|
| WO | 2003067624 A1 | 8/2003 |
| WO | 2003067625 A1 | 8/2003 |
| WO | 2003102537 A2 | 12/2003 |
| WO | 2004063702 A2 | 7/2004 |
| WO | 2004070763 A2 | 8/2004 |
| WO | 2005001879 A2 | 1/2005 |
| WO | 2005023986 A2 | 3/2005 |
| WO | 2005067000 A2 | 7/2005 |
| WO | 2005093784 A1 | 10/2005 |
| WO | 2005114705 A2 | 12/2005 |
| WO | 2006008537 A2 | 1/2006 |
| WO | 2006086294 A2 | 8/2006 |
| WO | 2007010272 A2 | 1/2007 |
| WO | 2007032849 A2 | 3/2007 |
| WO | 2007060755 A1 | 5/2007 |
| WO | 2007079586 A1 | 7/2007 |
| WO | 2007092873 A2 | 8/2007 |
| WO | 2007125297 A2 | 11/2007 |
| WO | 2007125354 A2 | 11/2007 |
| WO | 2008007069 A2 | 1/2008 |
| WO | 2008047101 A2 | 4/2008 |
| WO | 2009094780 A1 | 8/2009 |
| WO | 2009110025 A1 | 9/2009 |
| WO | 2009143623 A1 | 12/2009 |
| WO | 2010085720 A1 | 7/2010 |
| WO | 2011073794 A2 | 6/2011 |
| WO | 2011086430 A1 | 7/2011 |
| WO | 2011094529 A2 | 8/2011 |
| WO | 2011146737 A1 | 11/2011 |
| WO | 2012047465 A1 | 4/2012 |
| WO | 2012167207 A2 | 12/2012 |
| WO | 2012167208 A2 | 12/2012 |
| WO | 2012176534 A1 | 12/2012 |
| WO | 2013005058 A1 | 1/2013 |
| WO | 2013027055 A1 | 2/2013 |
| WO | 2013061142 A1 | 5/2013 |
| WO | 2014001827 A2 | 1/2014 |
| WO | 2014021960 A1 | 2/2014 |
| WO | 2014064399 A1 | 5/2014 |
| WO | 2014065800 A1 | 5/2014 |
| WO | 2014121107 A1 | 8/2014 |
| WO | 2014168660 A1 | 10/2014 |
| WO | 2014176316 A2 | 10/2014 |
| WO | 2015162435 A1 | 10/2015 |
| WO | 2015189548 A1 | 12/2015 |
| WO | 2016069104 A1 | 5/2016 |
| WO | 2016142669 A1 | 9/2016 |
| WO | 2016142674 A1 | 9/2016 |
| WO | 2016142675 A1 | 9/2016 |
| WO | 2016142679 A1 | 9/2016 |
| WO | 2016142681 A1 | 9/2016 |
| WO | 2016142683 A1 | 9/2016 |
| WO | 2016142685 A1 | 9/2016 |
| WO | 2016142686 A1 | 9/2016 |
| WO | 2016142689 A1 | 9/2016 |
| WO | 2016142690 A1 | 9/2016 |
| WO | 2016142691 A1 | 9/2016 |
| WO | 2016142692 A1 | 9/2016 |
| WO | 2016142693 A1 | 9/2016 |
| WO | 2016142694 A1 | 9/2016 |
| WO | 2016142696 A1 | 9/2016 |
| WO | 2016157032 A1 | 10/2016 |
| WO | 2017033251 A1 | 3/2017 |
| WO | 2017038169 A1 | 3/2017 |
| WO | 2017214718 A2 | 12/2017 |
| WO | 2018029918 A1 | 2/2018 |
| WO | 2018091910 A1 | 5/2018 |
| WO | 2018154318 A1 | 8/2018 |
| WO | 2018224050 A1 | 12/2018 |
| WO | 2019239118 A1 | 12/2019 |
| WO | 2020039371 A1 | 2/2020 |
| WO | 2021191758 A1 | 9/2021 |
| WO | 2021198689 A1 | 10/2021 |
| WO | 2022104448 A1 | 5/2022 |
| WO | 2022157719 A1 | 7/2022 |
| WO | 2022175465 A1 | 8/2022 |
| WO | 2023028696 A1 | 3/2023 |
| WO | 2023162203 A1 | 8/2023 |
| WO | 2024118604 A1 | 6/2024 |
| WO | 2024175925 A1 | 8/2024 |
| WO | 2024175927 A1 | 8/2024 |
| WO | 2024175928 A1 | 8/2024 |
| WO | 2025008775 A1 | 1/2025 |

OTHER PUBLICATIONS

Combined Search and Examination Report for GB Application No. GB2104652.9, mailed Sep. 28, 2021.

Webb, I.K., et al., "Trapping Mode Dipolar DC Collisional Activation in the RF-Only Ion Guide of a Linear Ion Trap/Time-of-Flight Instrument for Gaseous Bio-Ion Declustering", J Mass Spectrom., 48(9):1059-1065, Sep. 2013.

Baker, E.S., et al., "Ion Mobility Spectrometry—Mass Spectrometry Performance Using Electrodynamic Ion Funnels and Elevated Drift Gas Pressures", J Am Soc Mass Spectrom., 18:1176-1187 (2007).

Barrera, N.P., et al., "Mass spectrometry of membrane transporters reveals subunit stoichiometry and interactions", Nat Methods, 6(8):585-587 (2009).

Barrera, N.P., et al., "Micelles Protect Membrane Complexes from Solution to Vacuum", Science 321:243-246 (2008).

Fort, K.L., "Expanding the structural analysis capabilities on an Orbitrap-based mass spectrometer for large macromolecular complexes", Analyst, 143:100-105 (2018).

Hopper, J.T.S., et al., "Collision Induced Unfolding of Protein Ions in the Gas Phase Studied by Ion Mobility-Mass Spectrometry: The Effect of Ligand Binding on Conformational Stability", J. Am. Soc. Mass Spectrom., 20:1851-1858 (2009).

Kambara, H., et al., "Determination of Impurities in Gases by Atmospheric Pressure Ionization Mass Spectrometry", Analytical Chemistry, 49(2):270-275 (1977).

Kim, T., et al., "Design and Implementation of a New Electrodynamic Ion Funnel", Anal. Chem., 72:2247-2255 (2000).

Laganowsky, A., et al., "Mass spectrometry of intact membrane protein complexes", Nature Protocols , 8(4):639-651 (2013).

Niessen, W.M.A., "Advances in instrumentation in liquid chromatography-mass spectrometry and related liquid-introduction techniques", J. Chromatogr. A, 794:407-435 (1998).

Quintyn, R.S., et al., "Surface-Induced Dissociation Mass Spectra as a Tool for Distinguishing Different Structural Forms of Gas-Phase Multimeric Protein Complexes", Anal. Chem., 87:11879-11886 (2015).

Sakairi, M., et al., "Characteristics of a Liquid Chromatograph/Atmospheric Pressure Ionization Mass Spectrometer", Anal. Cham., 60:774-780 (1988).

Wang, S.C., et al., "Ion Mobility Mass Spectrometry of Two Tetrameric Membrane Protein Complexes Reveals Compact Structures and Differences in Stability and Packing", J. Am. Chem. Soc., 132: 15468-15470 (2010).

Webb, I.K., et al., "Trapping Mode Dipolar DC Collisional Activation in the RF-Only Ion Guide of a Linear Ion Trap/Time-of-Flight Instrument for Gaseous Bio-Ion Declustering", J Mass Spectrom., 48(9):1059-1065 (2013).

* cited by examiner

DE-CLUSTERING ION GUIDE

CROSS-REFERENCE TO RELATED APPLICATIONS

This application is a U.S. national phase filing claiming the benefit of and priority to International Patent Application No. PCT/GB2021/050807, filed Mar. 31, 2021, which claims priority from and the benefit of United Kingdom patent application No. 2004961 filed on Apr. 3, 2020. The entire contents of these applications are incorporated herein by reference.

FIELD OF THE INVENTION

The present invention relates generally to a declustering device that removes adducted species from analyte ions, and to a mass or mobility spectrometer containing such a device.

BACKGROUND

There is increasing focus on the study of relatively large molecules such as biomolecules in mass spectrometry, e.g. from areas including the biopharmaceutical interest in intact antibodies or the structural biology interest in protein complexes and membrane proteins. Analytes such as these are ionised by an ion source prior to being analysed in a mass spectrometer. However, the resulting analyte ions tend to be clustered with other species when leaving the ion source, such as when leaving an electrospray ion source. These other species are known as adducts and may comprise species such as salts or solvent molecules, for example. As the cluster of an analyte ion with an adduct species will have different physicochemical properties to the analyte ion alone (e.g. a different mass to charge ratio and/or ion mobility), it may be desired to remove the adduct species from the analyte ions prior to analysis or selection of the analyte ions. For example, it may be desired to remove the adduct molecules prior to mass filtering the analyte ions, e.g. because it may be desired to transmit analyte ions having a specific mass to charge ratio, whereas the cluster will have a different, possibly unknown, mass to charge ratio.

Declustering techniques are known for removing adduct species from analyte ions. For example, the ions generated by the ion source may be accelerated by the potential differences that drive the ions downstream through the instrument and such that the analyte-adduct clusters collide with background gas molecules and shed the adduct species. It is also known to radially confine the ionic clusters within an RF ion guide and to urge the clusters radially outwards towards the RF electrodes of the ion guide so as to cause RF heating of the clusters such that the analyte ions and adduct species separate.

However, it is desired to provide an alternative technique for declustering the adduct species from the analyte ions.

SUMMARY

The present invention provides a method of mass and/or ion mobility spectrometry comprising: providing an ion guide comprising a plurality of electrodes and having a background gas therein; applying an RF voltage to electrodes of the ion guide for radially confining ions therein; transmitting clusters of analyte ions and adduct species into the ion guide; applying, in a first mode, one or more AC voltage to the ion guide so as to oscillate the clusters such that they collide with molecules of the background gas and cause adduct species in the clusters to detach from the analyte ions, wherein the one or more AC voltage has a different amplitude and/or frequency to that of said RF voltage; and (i) varying the speed with which the clusters are urged along the ion guide during the first mode; and/or (ii) varying the amplitude and/or frequency of the one or more AC voltage as the clusters travel along the ion guide.

The speed at which the clusters are urged axially along the ion guide in the first mode may be varied so as to vary the transit time of the clusters through the declustering ion guide and hence vary the time that the clusters are subjected to oscillation by the AC voltage. This varies the amount of declustering performed in the first mode. Similarly, amplitude and/or frequency of the one or more AC voltage may be varied so as to vary the amount of declustering performed (on an ion of a given mass to charge ratio), and/or so as to vary (e.g. optimise) the amount of declustering for ions of different mass to charge ratios at different times.

Embodiments of the invention vary the conditions in which the clusters are subjected to the one or more AC voltage so as to vary or control the amount of declustering. This may be advantageous, for example, if the presence of some adduct species is relevant for analysis of the analyte. For example, it may be important to remove solvent adducts but preserve non-covalently bound drug molecules.

Embodiments of the invention vary the conditions in which the clusters are subjected to the one or more AC voltage so as to vary or control the amount of declustering or amount of conformation changes to the (e.g. protein) analyte ions. For example, it may be desired to provide a relatively low amount of conformational rearrangements or unfolding of the analyte ions.

Embodiments decouple the requirements of the RF voltage for radially confining ions from those of the AC voltage used for declustering, thereby allowing more degrees of freedom for optimisation of the radial confinement and/or declustering.

The amplitude and/or frequency of the one or more AC voltage may be varied with time.

The method may comprise transmitting ions from the ion guide into a mass filter and mass filtering the ions in the mass filter. The mass to charge ratio, or range of mass to charge ratios, that is selectively transmitted by the mass filter may be varied with time in synchronism with the variation of the amplitude and/or frequency of the one or more AC voltage with time, optionally so as to substantially only transmit ions that have been declustered in the ion guide.

Alternatively, the method may comprise transmitting ions from the ion guide into a mobility filter and mobility filtering the ions in the mobility filter; wherein the mobility, or range of mobilities, that is selectively transmitted by the mobility filter is varied with time in synchronism with the variation of the amplitude and/or frequency of the one or more AC voltage with time, optionally so as to substantially only transmit ions that have been declustered in the ion guide.

The method may comprise separating the clusters by mass to charge ratio or ion mobility prior to transmitting the clusters into the ion guide, and varying the amplitude and/or frequency of the one or more AC voltage with time based on the mass to charge ratio or ion mobility of the clusters being transmitted into the ion guide.

For example, the clusters may be separated by scanning/stepping a mass filter (e.g. quadrupole mass filter), mass selective ion trap or other separator device so as to transmit ions having different mass to charge ratios to the ion guide at different times. The separator may be scanned/stepped in this manner over a time period and the variation of the one or more AC voltage may be synchronised with this time period such that clusters having different mass to charge ratios experience different AC amplitudes and/or frequencies in the ion guide. Similarly, the clusters may be separated by an ion mobility separator so as to transmit ions having different mobilities to the ion guide at different times. The separator may separate the ions over a time period and the variation of the one or more AC voltage may be synchronised with this time period such that clusters having different mobilities experience different AC amplitudes and/or frequencies in the ion guide.

The method may comprise mass analysing ions from the ion guide in a mass analyser; wherein operation of the mass analyser is varied with time so as to vary the mass to charge ratio, or range of mass to charge ratios, that the mass analyser is capable of analysing or is optimised to analyse; and wherein this mass to charge ratio, or range of mass to charge ratios, is varied with time in synchronism with the variation of the amplitude and/or frequency of the one or more AC voltage, optionally so as to substantially only mass analyse ions that have been declustered in the ion guide For example, the mass analyser may be a quadrupole mass analyser comprising a quadrupole mass filter that is scanned or stepped with time (in synchronism with the one or more AC voltage) so as to transmit different mass to charge ratios at different times to a detector.

Alternatively, the mass analyser may be a Time of Flight mass analyser that comprises a pusher and/or puller electrode that is repeatedly and intermittently activated so as to pulse the ions into a time of flight region to a detector. The operation of the Time of Flight mass analyser may be varied with time for mass analysing different ranges of mass to charge ratios at different times, wherein the range is varied with time in synchronism with the variation of the amplitude and/or frequency of the one or more AC voltage.

The Time of Flight mass analyser may be operated in an Enhanced Duty Cycle (EDC) mode. In this mode ions are pulsed towards the Time of Flight mass analyser and to the pusher and/or puller electrode, and the time at which the pusher and/or puller electrode is activated is synchronised with the time that the ions are pulsed towards the Time of Flight mass analyser such that ions having one or more predetermined mass to charge ratio are pulsed towards the detector by the pusher and/or puller electrode. The time delay between pulsing ions towards the Time of Flight mass analyser and activating the pusher and/or puller electrode may be varied for different pulses towards the Time of Flight mass analyser, e.g. so as to optimise the mass analysis of ions having different mass to charge ratios in different ones of these pulses. This time delay may be varied with time in synchronism with the variation of the amplitude and/or frequency of the one or more AC voltage.

It is alternatively contemplated that the mass analyser may record mass spectral data as a function time (i.e. as a function of the frequency and/or amplitude of the one or more AC voltage). The recorded data may then be post-processed to obtain mass spectral data at the desired AC voltage properties. For example, the mass spectral data may be filtered so as to only retain data that is for declustered ions.

The one or more AC voltage may be a plurality of different AC voltages having different amplitudes and/or frequencies, and the different AC voltages may be applied at different axial locations along the length of the ion guide.

The AC voltages may be applied at progressively more downstream axial locations of the ion guide have progressively lower amplitudes.

This is beneficial since as clusters move along the ion guide and shed adduct ions their mobility tends to increase, and so reducing the amplitude of the AC voltages along the ion guide helps prevent these ions oscillating with large amplitudes that will cause them to be lost to electrodes of the ion guide. The different AC voltages may (alternatively or additionally) have different frequencies for the same purpose.

The electrodes of the ion guide may define a conduit through which the clusters are guided, wherein the RF voltage applied to the electrodes radially confines the ions and urges them towards a central axis through the conduit, and wherein the AC voltage causes the clusters to oscillate about the central axis, in the first mode.

This enables the clusters to be oscillated with a relatively large amplitude and relatively low risk of them striking the electrodes of the ion guide and being lost to the system. This is in contrast to some conventional techniques in which ions are driven radially towards the RF electrodes so as to oscillate and heat them.

The AC voltage may cause the ions to oscillate about the central axis such that the clusters have substantially the same average amplitude of oscillation either side of the axis.

There may be substantially no gas flow through the ion guide, at least in the first mode. Additionally, or alternatively, a gas flow may be provided through the ion guide in either the downstream or upstream direction and voltages may be applied to the ion guide to oppose the force on the ions due to the gas flow, wherein the gas flow and/or voltages are selected or varied so as to slow or vary the transit time of the clusters through the ion guide.

The step of varying the speed with which clusters are urged along the ion guide may comprise repeatedly travelling a transient DC voltage along the ion guide so as to urge the clusters along the ion guide; and the amplitude of the transient DC voltage, and/or the speed and/or frequency with which the transient DC voltage moves along the ion guide, may be varied with time so as to vary the speed with which the clusters are urged along the ion guide in the first mode.

The ion guide may comprise a plurality of electrodes spaced along its longitudinal axis and each time the transient DC voltage is travelled along the ion guide, the transient DC voltage may be successively applied to different electrodes, or successively applied to different groups of multiple electrodes, along the ion guide so that the transient DC voltage moves along the ion guide.

The step of varying the speed with which clusters are urged along the ion guide may comprise generating an axial electric field along the ion guide by simultaneously applying different DC voltages to different electrodes of the ion guide, and varying the different voltages so as to vary the magnitude of the electric field and hence vary the speed with which the clusters are urged along the ion guide in the first mode.

Alternatively, or additionally, the step of varying the speed with which clusters are urged along the ion guide may comprise providing a gas flow through the ion guide so as to urge clusters along the ion guide and varying the speed of the gas flow.

During the first mode, the background gas may be maintained at a pressure between 0.01 and 10 millibar.

The method may comprise varying the pressure and/or composition of the background gas over time, e.g. during the first mode.

The background gas may be maintained at a first pressure, or be varied within a first range of pressures, during the first mode, whereas the background gas may be maintained at a pressure that is lower than the first pressure, or first range of pressures, during a second mode in which the AC voltage is not applied to the ion guide.

The method may comprise operating the ion guide in a second mode in which said one or more AC voltage is not applied to the ion guide.

The RF voltage desirably does not cause the clusters to oscillate to the extent that the analyte ions detach from the adduct species in the clusters.

In this second mode, the clusters may substantially not be declustered. In this mode the speed with which the clusters are urged along the ion guide may, or may not, be varied.

In the second mode the ion guide may operate in a higher transmission mode than the first mode, i.e. a greater proportion of the analyte ions may be transmitted in the second mode.

The method may comprise switching between the first and second modes whilst said clusters are passing through the ion guide.

The method may comprises repeatedly switching between the first and second modes whilst said clusters are passing through the ion guide.

The method may comprise ionising an analyte solution so as to produce said clusters, wherein the analyte solution comprises a membrane protein dissolved in a solvent using a detergent, and wherein the analyte ion in the cluster is a membrane protein ion and the adduct species in the cluster is a detergent molecule.

The method subsequently comprises said step of transmitting clusters of analyte ions and adduct species into the ion guide.

The method may comprise a step of forming the analyte solution by dissolving the membrane protein in the solvent using the detergent.

By way of example only, the membrane protein and/or solvent and/or detergent may any of those used in Lengqvist et al. JBC, Vol. 279, No. 14, Issue of April 2, pp. 13311-13316, 2004. For example, the membrane protein may be Microsomal glutathione transferase-1 (MGST1). The detergent may be Triton X-100. The solvent may be an aqueous solution of ammonium acetate.

It is alternatively contemplated that the membrane protein and/or solvent and/or detergent may any of those used in Barrera et al. Science, 321, 243, 2008. For example, the membrane protein may be Heteromeric (ATP)—binding cassette transporter complex ($BtuC_2D_2$) and/or the detergent may be n-dodecyl-β-D-maltoside (DDM).

It is alternatively contemplated that the membrane protein and/or solvent and/or detergent may be any of those used in US 2015/0346214. For example, the membrane protein may be one of: ammonium channel C-terminally fused to green fluorescent protein (AmtB-GFP), aquaporin Z membrane protein complex (AQPZ), ammonium channel membrane protein complex (AmtB), mechanosensitive channel of large conductance (MscL), acriflavine resistance protein B (AcrB), G protein-coupled receptor (GPCR), multidrug transporter protein (EmrE), integral membrane protein (LmrP), multidrug resistance protein (MexB), inner membrane protein (MacB), transmembrane P-glycoprotein 1 (P-gp), lipid A export ATP-binding/permease protein (MsbA), probable multidrug resistance protein (NorM), or inward rectifier potassium channel (Kirbac3.1). The detergent may be n-decyl-β-D-maltoside (DM), n-undecyl-β-D-maltoside (UDM), n-dodecyl-β-D-thiomaltopyranoside (DDTM), Cymal-5, Cymal-6, octyl glucose neopentyl glycol (OGNG), n-octyl-β-D-glucopyranoside (OG), tetraethylene glycol monooctyl ether (C8E4), pentaethylene glycol monooctyl ether (C8E5), octaethylene glycol monododecyl ether (C12E8), or anapoe-58 (Brij-58, C16E20). The solvent system may be an aqueous solution of: ammonium acetate; ammonium bicarbonate; sodium chloride, TRIS and beta-mercaptoethanol; sodium chloride, glycerol, TRIS, and beta-mercaptoethanol; sodium chloride, imidazole, TRIS, and beta-mercaptoethanol; or sodium chloride, imidazole, glycerol, TRIS, and beta-mercaptoethanol.

Although the clusters have been described as being clusters of membrane protein ions and detergent, it is contemplated that the analyte ions and/or adduct species may be other types of species. For example, the adduct species in the clusters may be salts or molecules of the solvent.

The method may comprise mass analysing and/or ion mobility analysing the analyte ions and any remaining clusters downstream of the ion guide so as to obtain mass and/or mobility peaks, respectively, of the analyte ions and remaining clusters.

The method may comprise determining the width and/or signal-to-noise ratio of one or more of the peaks and varying the frequency and/or amplitude of the one or more AC voltage during the first mode so as to alter the width and/or signal-to-noise ratio of peaks for subsequently analysed analyte ions and clusters.

The width of the peak may be the FWHM width.

The method may be performed on a mass or mobility spectrometer comprising: a first vacuum chamber having an inlet aperture; a second vacuum chamber adjacent the first vacuum chamber; and a differential pumping aperture separating the first and second vacuum chambers; wherein said ion guide is arranged in the first vacuum chamber.

The first vacuum chamber may comprise an ion guiding device having a first portion that guides ions along a first axial path, a second portion that guides ions along a second different axial path, and a transition portion that urges ions from the first axial path onto the second axial path.

The first axial path may be substantially parallel to, but radially displaced from, the second axial path. This ion guiding device may be arranged so as to guide ions from the inlet aperture to and through the differential pumping aperture.

Said ion guide may be part of, or downstream of, said ion guiding device.

For example, the ion guide may form part, or all, of the second portion of the ion guiding device.

The first vacuum chamber comprises a gas pumping port for evacuating the first vacuum chamber of gas, and at least part of the second portion of the ion guide may be shielded from the gas pumping port by a barrier. Alternatively, or additionally, the ion guiding device may be arranged such that a central axis of the first axial path is coaxial with a central axis said gas pumping port.

A mass and/or ion mobility analyser may be arranged in the second vacuum chamber or in a further vacuum chamber downstream of the second vacuum chamber.

The mass analyser may be a Time of Flight mass analyser.

The present invention also provides a mass or mobility spectrometer configured to perform any of the methods described herein.

Accordingly, the present invention provides a mass or mobility spectrometer comprising: an ion guide comprising a plurality of electrodes and a background gas therein; an RF voltage supply for applying an RF voltage to electrodes of the ion guide for radially confining ions therein; one or more AC voltage supply for applying, in a first mode, one or more AC voltage to the ion guide so as to oscillate clusters of analyte ions and adduct species such that they collide with molecules of the background gas and cause adduct species in the clusters to detach from the analyte ions, wherein the AC voltage has a different amplitude and/or frequency to that of said RF voltage; and control circuitry configured to control the spectrometer so as to: (i) vary the speed with which the clusters are urged along the ion guide during the first mode; and/or (ii) vary the amplitude and/or frequency of the one or more AC voltage as the clusters travel along the ion guide.

The spectrometer may comprise a DC voltage supply connected to electrodes of the ion guide, wherein the control circuitry controls the DC voltage supply to successively apply a DC voltage to different ones of the electrodes so as to repeatedly travel a transient DC voltage along the ion guide; wherein the amplitude of the transient DC voltage, and/or the speed and/or frequency with which the transient DC voltage moves along the ion guide, is varied with time for varying the speed with which the clusters are urged along the ion guide.

The spectrometer may comprise a DC voltage supply connected to electrodes of the ion guide, wherein the control circuitry controls the DC voltage supply to simultaneously apply different DC voltages to different ones of the electrodes for generating an axial electric field along the ion guide, and vary the different voltages with time so as to vary the magnitude of the electric field for varying the speed with which the clusters are urged along the ion guide.

BRIEF DESCRIPTION OF THE DRAWINGS

Various embodiments will now be described, by way of example only, and with reference to the accompanying drawings in which.

DETAILED DESCRIPTION

Embodiments of the present invention provide sustained activation of ion species, such as relatively large analyte ion species, in order to remove adduct species prior to selection and/or analysis of the analyte ions, e.g. by mass filtering and/or mass analysing the analyte ions.

Figures 1A, 1B:
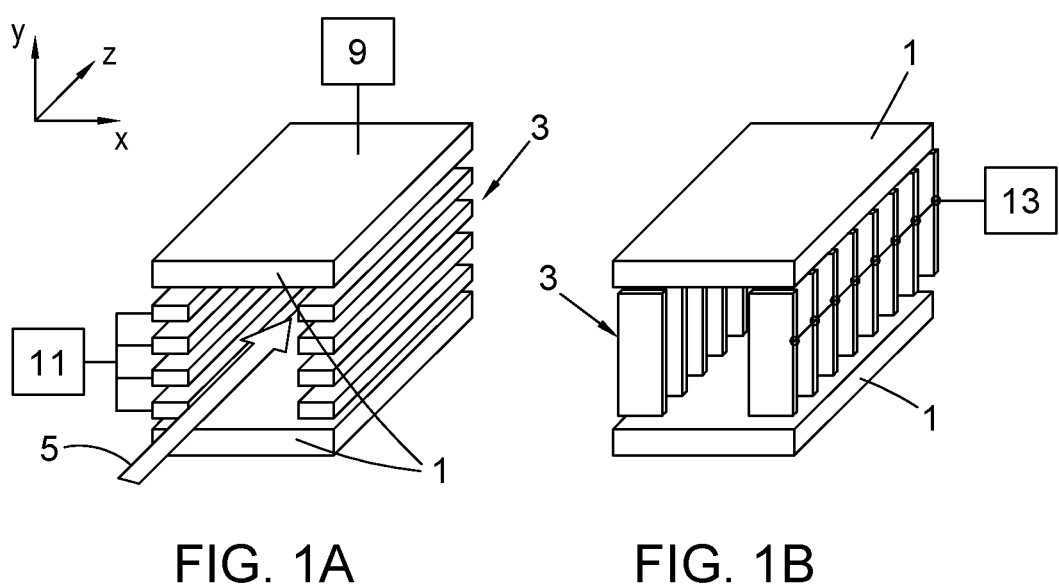
FIGS. 1A and 1B show schematics of declustering devices according to embodiments of the present invention.

FIGS. 1A and 1B show schematics of declustering devices according to embodiments of the present invention.

Referring to FIG. 1A, the declustering device comprises two planar upper and lower electrodes 1 that are spaced apart from each other in a y-dimension and have major faces that face each other. In use, a voltage supply 9 applies DC voltages to these electrodes so as to generate an electric field that confines ions between the electrodes 1. Alternatively, the voltage supply 9 may supply RF voltages to these electrodes 1 so as to confine the ions therebetween. The planar electrodes 1 are shown as being parallel to each other, although it is contemplated that they may be angled to each other, e.g. such that when DC and/or AC voltages are applied to these electrodes ions are driven through the device between the planar electrodes 1. The declustering device also comprises side electrodes 3 that are spaced apart from each other in an x-dimension and are arranged such that the side electrodes 3, together with the upper and lower electrodes 1, define a conduit therebetween through which ions 5 can be guided. In the embodiment depicted in FIG. 1A, each side wall of the declustering device comprises multiple electrodes 3 that are each elongated in the z-dimension, i.e. in the direction that ions 5 travel through the device, and which are spaced apart along the direction between the upper and lower electrodes 1 (i.e. in the x-dimension). These electrodes 3 may be planar and may have major faces that face towards the upper and lower electrodes 1. These electrodes 3 may be arranged parallel to each other. In use, a voltage supply 11 may apply RF voltages to these side electrodes 3 so as to generate an AC electric field and pseudo-potential barrier that radially confines ions between the electrodes 3 (in the x-dimension). For example, opposing phases of an RF voltage may be applied to electrodes 3 that are adjacent each other within each side wall. Side electrodes 3 that are adjacent and oppose each other in the x-dimension may be maintained at the same RF phase.

Although each side wall has been described as comprising multiple RF electrodes 3, it is contemplated that it may instead comprise only a single RF electrode. Less preferably, rather than applying RF voltages to the electrode(s) 3 in each side wall it is contemplated that a DC voltage may be applied to the electrode(s) 3 in each side wall so as to confine ions in the x-dimension.

As described above, in use, the RF and/or DC voltages applied to the upper, lower and side electrodes are such that ionic clusters 5 entering the ion transmission conduit along an axis arranged in the z-dimension are radially confined relative to that axis (i.e. radially confined in the x- and y-dimensions).

In a first, declustering mode, one or both of voltage supplies 9,11 apply an AC voltage to one or more of the electrodes 1,3 so as to cause the clusters of analyte ions and adduct species to oscillate in the radial direction. For example, the AC voltage may be applied between the upper and lower electrodes 1 so as to cause ionic clusters to oscillate in the y-dimension. A background gas is present in the ion transmission conduit and as such, the oscillation of the ionic clusters causes the clusters to collide with the molecules of the background gas, causing the clusters to increase their internal energy and decluster, i.e. the adduct species detach from the analyte ions. It is contemplated that the background gas pressure may be maintained at sub-atmospheric pressure or atmospheric pressure during this process. The energy input to the cluster is related to its size, the strength of the electric field generated by the AC voltage and the gas pressure.

The amplitude and frequency of the AC voltage are selected such that at least some of the analyte ions remain radially confined by the electrodes 1,3 and desirably such that the analyte ions are not fragmented by collisionally induced dissociation (CID). For example, the AC voltage may be applied around the DC offset potential of the RF voltage used to radially confine the ions. The ensures that the ion excursions due to the declustering AC voltage are symmetrical about the central axis, rather than extending relatively far from the axis and striking an electrode 1,3. The frequency of the declustering AC voltage may also be selected such that the excursion of the ions of interest from the central axis is such that the ions are not lost to the electrodes 1,3. The most efficient form of the declustering AC voltage is a square wave, since ions experience the de-clustering field essentially all of the time. After declustering, the analyte ions may then be onwardly transmitted in a downstream direction through the conduit for further analysis.

The clusters can be driven through the declustering device in order to control and vary the amount of declustering. This may be achieved by urging the clusters through the declustering device and varying the force that is applied to the clusters to achieve this so as to vary the speed of the clusters through the device. For example, if the clusters are urged through the declustering device relatively slowly then, in the first declustering mode of operation, they will be subjected to the oscillations caused by the declustering AC voltage for a relatively long period of time, thus causing a relatively large amount of declustering (e.g. a relatively large proportion of the analyte will be declustered and/or a relatively large number of adducts will be declustered from each cluster). In contrast, if the clusters are urged through the declustering device more quickly then, in the first declustering mode of operation, they will be subjected to the oscillations for a shorter period of time, thus causing a smaller amount of declustering (e.g. a smaller proportion of the analyte will be declustered and/or a smaller number of adducts will be declustered from each cluster).

The clusters may be urged through the declustering device by one or more of several means, including one or more of the following. A transient DC voltage may be repeatedly travelled along the declustering device so as to urge the clusters therethrough. The transient DC voltage is successively applied to electrodes that are axially spaced along the declustering device so as to generate a DC potential barrier that moves along the declustering device, thereby causing the ions that are radially confined within the declustering device to be urged through it. These axially spaced electrodes are not shown in FIG. 1A, but electrodes 3 in FIG. 1B may be used for this purpose. The step of travelling the transient DC voltage along the declustering device may comprise controlling a voltage supply 13 to successively applying the transient DC voltage to each and every one of the axially spaced electrodes 3. Alternatively, the transient DC voltage may be successively applied only to every nth electrode that is downstream of the electrode that the transient DC voltage was last applied to, where n is an integer greater than 1 (e.g. only applied to alternate axially spaced electrodes). It is also contemplated that the transient DC voltage may be simultaneously applied to a group of multiple electrodes at any given time, and the transient DC voltage may be sequentially applied to different groups of multiple electrodes at different respective times such that the transient DC voltage moves along the declustering device. Each group of electrodes may consist of axially consecutive electrodes of the declustering device. The properties of the transient DC voltage, such as amplitude and/or speed and/or frequency of travel may be varied so as to vary the speed with which the clusters are urged through the declustering device.

As an alternative to the transient DC voltages, or in addition thereto, a static electric field may be generated by the voltage supply 13 applying a potential difference across the axial length of the declustering device so as to urge the clusters through it. The magnitude of the electric field may be varied with time so as to vary the speed with which the clusters are urged through the declustering device.

In addition, or as an alternative, to the other techniques described herein for varying the amount of declustering, a gas flow may be used to urge the clusters through the declustering device and the gas flow speed may be varied with time so as to vary the speed with which the clusters are urged through the declustering device.

In addition, or as an alternative, to the other techniques described herein for varying the amount of declustering, it is contemplated that the clusters may be axially trapped within the declustering device, e.g. by applying voltages to the upstream and downstream portions of the declustering device, and the amount of declustering may be varied by varying the time that the clusters are trapped for before being released from the declustering device.

In addition, or as an alternative, to the other techniques described herein for varying the amount of declustering, the composition or pressure of the background gas within the declustering device may be varied so as to vary the amount of declustering.

The declustering device may be operated in a second, different mode in which the declustering AC voltage is not applied such that the clusters are not de-clustered. For example, in this mode only DC voltages (and no AC/RF voltages) may be applied to the upper and lower electrodes 1 so as to confine the ions in the y-dimension. The DC voltages (i.e. potentials) applied to upper and lower electrodes 1 may be higher than the DC bias of the side electrodes 3 (about which the RF voltages are applied to confine ions in the x-direction). However, it is contemplated that in less preferred embodiments RF voltages may be applied to upper and lower electrodes 1 in addition to, or instead of, the DC voltages so as to confine ions in the y-dimension (but not so as to cause declustering). The clusters may be radially confined by the electrodes 1,3 and guided through the conduit. In the second mode, ions 5 enter the declustering device in the z-direction.

The declustering device may be switched between the two modes whilst clusters are flowing through the conduit by switching the declustering AC voltage on or off.

FIG. 1B shows another embodiment of the declustering device that is the same as that described above in relation to FIG. 1A, except that the arrangements of the side electrodes 3 differ. In the embodiment depicted in FIG. 1B, each side wall of the declustering device comprises multiple electrodes 3 that are each elongated in the y-dimension, i.e. in the direction between the upper and lower electrodes 1. These electrodes 3 may be planar and may have major faces that are substantially orthogonal to the major faces of the upper and lower electrodes 1. The electrodes 3 in each side wall may be spaced apart from each other in a direction along the z-dimension. The electrodes 3 in each side wall may be arranged parallel to each other. In use, RF voltages are applied to these side electrodes 3 so as to generate an AC electric field and pseudo-potential barrier that radially confines ions between the side walls (in the x-dimension). For example, opposing phases of an RF voltage may be applied to electrodes that are adjacent each other within each side wall. Side electrodes 3 that are adjacent and oppose each other in the x-dimension may be maintained at the same RF phase. Less preferably, rather than applying RF voltages to the electrodes in each side wall it is contemplated that a DC voltage may be applied to the electrodes 3 in each side wall so as to radially confine ions in the x-dimension.

As has been described above, various techniques may be used for varying the amount of declustering, such as varying properties of a transient DC voltage that is repeatedly travelled along the declustering device or varying the magnitude of a static electric field across the axial length of the declustering device. It will be appreciated that the transient DC voltage may be travelled along the declustering device by applying the transient DC voltage to different ones of the electrodes 3 in FIG. 1B at different times. Similarly, the static electric field may be arranged by simultaneously applying different DC voltages to different ones of the electrodes 3.

Although the upper and lower electrodes 1 have been described as being parallel to each other in the above embodiments, it is contemplated that they may be angled to each other, e.g. such that when DC and/or AC voltages are applied to these electrodes ions are driven through the device between the planar electrodes. Alternatively, or additionally, although each of the upper and lower electrodes 1 have been described as being single electrodes, it is contemplated that one or each of these may be replaced with an array of multiple RF electrodes (or DC electrodes), e.g. so as to form the upper and/or lower wall from multiple electrodes in a corresponding manner to that in which one of the side walls 3 is formed.

For the avoidance of doubt, although electrodes 1 have been described as upper and lower electrodes, the y-dimension may be arranged in any orientation and not necessarily vertically.

In mass spectrometry, analyte ions are often generated by relatively high pressure ion sources, e.g. by atmospheric pressure ion sources. It is then necessary to transmit these ions into a vacuum region of the mass spectrometer, since the processing or analysis of the ions is required to be performed at relatively low vacuum pressures.

Figure 2:
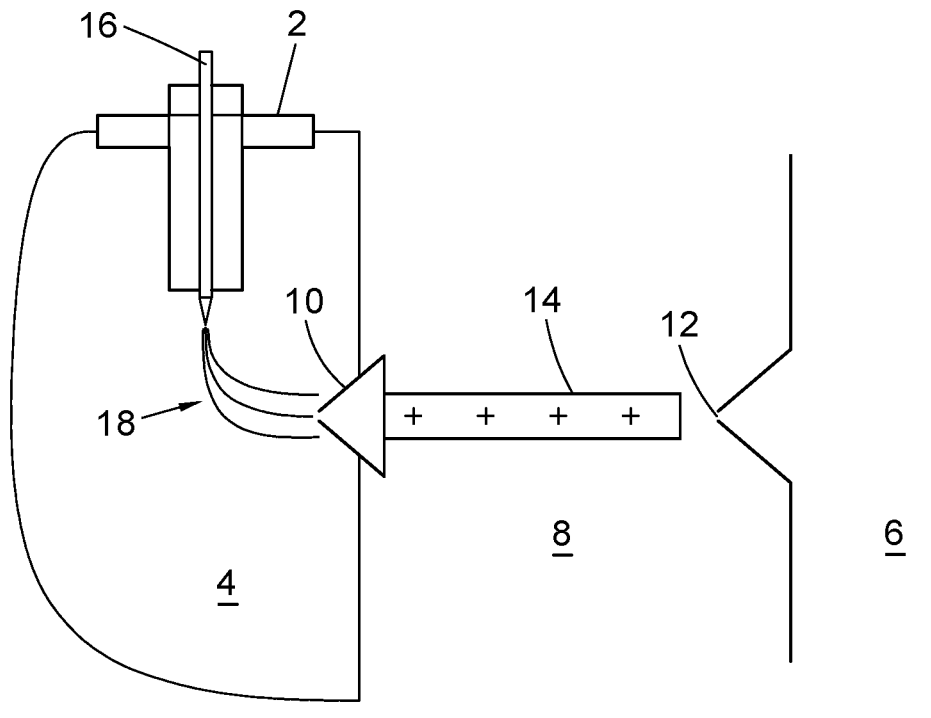
FIG. 2 schematically illustrates the upstream end of a mass spectrometer, including the ion source.

FIG. 2 schematically illustrates a known arrangement comprising an electrospray ionisation (ESI) probe 2 arranged in an atmospheric pressure region 4, a low pressure vacuum chamber 6 of a mass spectrometer, and an intermediate pressure chamber 8 arranged between the atmospheric pressure region 4 and the vacuum chamber 6 of the mass spectrometer. A cone 10 is arranged between the atmospheric pressure region 4 and the intermediate pressure chamber 8 so that the intermediate pressure chamber 8 is able to be maintained at a lower pressure than the atmospheric pressure region 4, and a differential pumping aperture 12 is arranged between the vacuum chamber 6 and the intermediate pressure chamber 8 so that the vacuum chamber is able to be maintained at a lower pressure than the intermediate pressure chamber. An ion guide 14, such as an ion tunnel or multipole ion guide, is arranged in the intermediate pressure chamber 8 for guiding ions received through the cone 10 towards and through the differential pumping aperture 12.

In operation, the intermediate pressure chamber 8 is pumped to a lower pressure than the atmospheric pressure region 4, and the vacuum chamber 6 is pumped to a lower pressure than the intermediate pressure chamber 8. Analyte solution is then delivered to the capillary 16 of the ESI probe 2 and is sprayed from the tip thereof so as to produce analyte ions 18 in the atmospheric pressure region 4. The analyte ions 18 then pass through the cone 10 and into the ion guide 14 in the intermediate pressure chamber 8. The ion guide 14 guides the ions through the intermediate pressure chamber and through the differential pumping aperture 12 into the vacuum chamber 6. The ions may then be fragmented in the vacuum chamber 6, or in a further downstream vacuum chamber of the spectrometer which may be pumped to an even lower pressure. In conventional declustering techniques, the voltage applied to the cone 10 may be selected so as to accelerate the clusters through the background gas in atmospheric pressure region 4 at a speed such that they decluster.

According to an embodiment of the present invention, the declustering device may be arranged downstream of the ESI probe 2 so as to receive the clusters. For example, the declustering device may replace the ion guide 14. Alternatively, the declustering device may be arranged within, upstream or downstream of the ion guide 14 so as to decluster the analyte ions before they pass through differential pumping aperture 12 into the vacuum chamber 6.

Figures 3A, 3B:
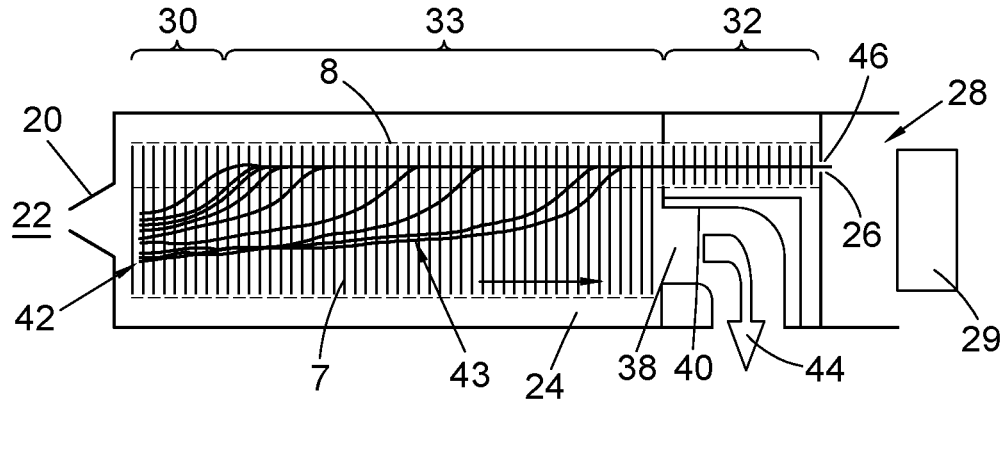
FIGS. 3A-3C show views of an ion guide that may be used in embodiments of the present invention.

FIG. 3A shows part of another embodiment of the present invention that is similar to that shown in FIG. 2, except that the ion guide 14 has been replaced by another type of ion guide that guides ions along a first axial path and then onto and along a second axial path that is displaced from the first axial path. Voltages may be applied to the ion guide so as to urge ions along the ion guide in the downstream direction.

In the embodiment of FIG. 3A, the cone 20 separates the relatively high pressure region 22 (such as an atmospheric pressure region) from the first vacuum chamber 24. An electrospray ionisation (ESI) probe, or other source of ions, may be arranged in high pressure region 22. A differential pumping aperture 26 is arranged between the first vacuum chamber 24 and a second vacuum chamber 28 so that the second vacuum chamber 28 is able to be maintained at a lower pressure than the first vacuum chamber 24. The ion guide is arranged in the first vacuum chamber 24 for guiding ions received through the cone 20 towards and through the differential pumping aperture 26, as will be described in more detail below. A mass analyser 29, such as an orthogonal acceleration Time of Flight mass analyser, may be arranged in the second vacuum chamber 28 for analysing ions transmitted through the differential pumping aperture 26.

The ion guide comprises a first portion 30 for guiding ions along a first axial path, a second portion 32 for guiding ions along a second axial path (which may be parallel to and displaced the first axial path), and a transition portion 33 for transferring ions from the first axial path to the second axial path. In the depicted embodiment, each of the first and second ion guide portions 20,32 comprises a plurality of axially separated apertured electrodes (e.g. ring electrodes) for radially confining the ions along their respective axial paths. RF voltages are applied to these electrodes so as to radially confine the ions. For example, different (e.g. opposite) phases of an RF voltage supply may be applied to adjacent apertured electrodes in the known manner so as to radially confine the ions.

FIG. 3B shows three cross-sectional views of the electrode arrangement in the ion guide at different axial points along the ion guide. View 30 shows the electrode arrangement proximate the cone 20, where the ions are confined in the first portion 30 of the ion guide to the first axial path by the apertured electrodes 34. View 32 shows the electrode arrangement proximate the differential pumping aperture 26, where the ions are confined in the second portion of the ion guide 32 to the second axial path by the apertured electrodes 35. View 33 shows the electrode arrangement in the transition region 33 of the ion guide, in which the ions are transferred from the first axial path of the first ion guide portion 30 to the second axial path of the second ion guide portion 32. This transfer may be achieved by: providing one or more electrodes 36 in the transition region, each of which only partially encircles the first axial path and has a radial opening in its side that is directed towards the second axial path (e.g. an arc-shaped electrode); providing one or more electrodes 37 in the transition region, each of which only partially encircles the second axial path and has a radial opening in its side that is directed towards the first axial path (e.g. an arc-shaped electrode); and urging ion from the first axial path, through the radial openings in the electrodes, and onto the second axial path. This urging of the ions may be performed by providing an electrical potential difference, e.g. by applying voltages to the electrodes in the transition region so as to provide a potential difference in the radial direction.

Figure 3C:
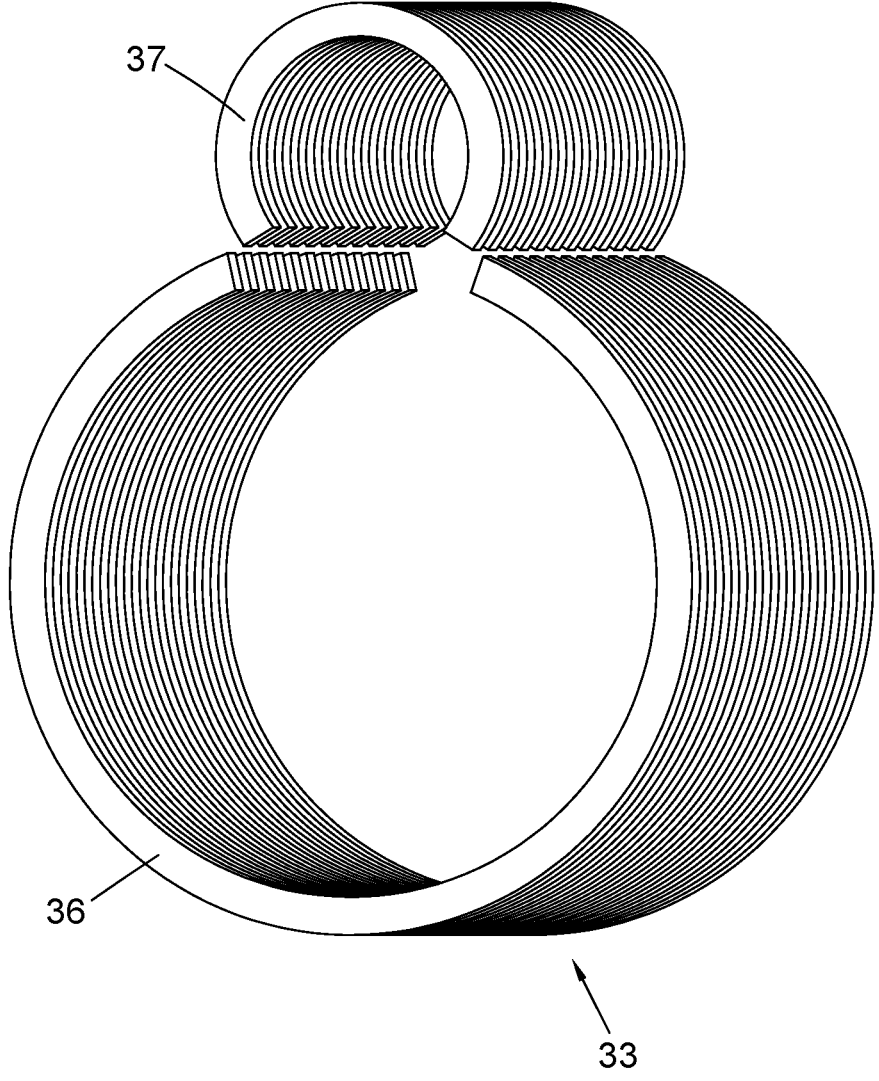

FIG. 3C shows a perspective view of the electrode arrangement in the transition region.

Referring back to FIG. 3A, the first ion guide portion 30 may be arranged in the first vacuum chamber 24 such that the aperture of the cone 20 is aligned (e.g. coaxial) with the first axial path defined by the first ion guide portion 30. The second ion guide portion 32 may be arranged in the first vacuum chamber 24 such that the aperture in the differential pumping aperture 26 is aligned (e.g. coaxial) with the second axial path defined by the second ion guide portion 32.

A vacuum pump is provided for evacuating the first vacuum chamber 24 through a gas pumping port 38. The opening of the gas pumping port 38 may be aligned (e.g. coaxial) with the first axial path of the first ion guide portion 30. The end of the ion guide formed by the second portion 32 may be physically shielded from the gas pumping port 38 by a barrier 40.

In operation, ions are generated in high pressure region 22. The pressure differential between the high pressure region 22 and the first vacuum chamber 24 causes gas and ions to pass through the cone 20 and into the first vacuum chamber 24, whereby the gas and ions tend to expand into the lower pressure region. The ions enter into the first portion 30 of the ion guide and are radially confined thereby, but may be relatively diffuse, as shown by ion cloud 42. The ions are driven axially along the first portion 32 of the ion guide, at least partially by the gas flow towards the gas pumping port 38. When ions reach the transition portion 33 of the ion guide, they are urged in the radial direction and onto the second axial path defined by the second portion 32 of the ion guide, as shown by ion trajectories 43. As described above, this may be caused by applying a potential difference in the radial direction. As a result, ions are caused to migrate from the first ion guide portion 30 to the second ion guide portion 32. In contrast, the majority of the gas flow continues substantially along the axis defined by the first ion guide portion 30 towards and through the gas pumping port 38, as shown by arrow 44. Ions are therefore radially confined in the second ion guide portion 32 and travel along the second axial path towards the differential pumping aperture 26, whereas the majority of the gas is routed in a different direction towards the gas pumping port 38. At least part of the second portion 32 of the ion guide may be shielded from the pumping port by a barrier 40, so that the gas flow towards the pumping port 38 is directed away from the second axial path of the second ion guide portion 32.

The second ion guide portion 32 may have a smaller radial cross-section than the first portion 30 so that the ions are radially compressed in the second portion as compared to the first portion, as shown by ion beam 46. Ions are then guided by the second ion guide portion 32 through the differential pumping aperture 26 and into the second vacuum chamber 28.

The clusters and other ions may be urged along the ion guide by a static DC electric field. For example, a DC voltage gradient may be arranged between a point in the first vacuum chamber 24 towards the cone 20 and a point towards the differential pumping aperture 26, e.g. by applying different DC voltages to electrodes of the ion guide. The DC voltage gradient may be arranged along the first and/or second axis of the ion guide (and/or the transition region 33), e.g. by applying different voltages to electrodes of the ion guide at different axial locations. Alternatively, or additionally, clusters and other ions may be urged along the ion guide by repeatedly travelling one or more DC potential barrier along the first and/or second ion guide portions 30,32. This may be performed by successively applying one or more transient DC voltage to electrodes along the ion guide. The one or more DC potential barrier may be repeatedly travelled along the ion guide.

As will be described below, the declustering device may be located upstream, downstream or within the ion guide. It has been recognised that the ion guide in the above-described arrangement is able to handle relatively high gas loads (e.g. since the ion guide initially conveys the ions with the gas flow towards the pumping port and then moves the ions out of the gas flow), and that the ion guide therefore enables the first vacuum chamber 24 to be operated at relatively high pressures. This is advantageous as the relatively high pressure provides a suitable background gas in which the declustering device can oscillate the clusters so as to cause them to decluster.

Figures 4A, 4B:
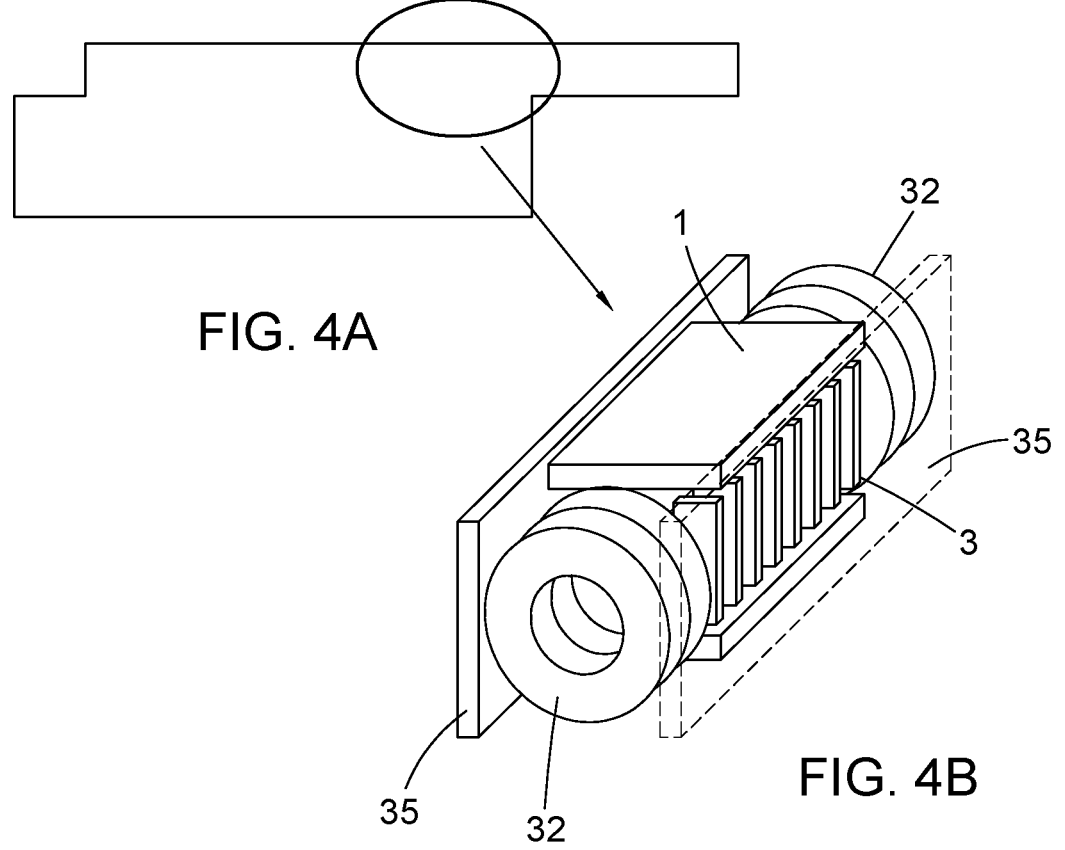
FIG. 4A shows a schematic side view of the of the ion guide shown in FIGS. 3A-3C.
FIG. 4B shows a schematic of a declustering device arranged within the ion guide, according to an embodiment.

As described above, the declustering device may be located upstream, downstream or within the ion guide. FIGS. 4A and 4B schematically illustrate the position of the declustering device within the ion guide in one embodiment.

FIG. 4A shows a schematic side view of the of the ion guide shown and described above in relation to FIGS. 3A-3C. The declustering device may be located within or downstream of the ion guide. For example, the declustering device may be located downstream of transition region 33 of the ion guide, in portion 32 of the ion guide (shown in FIG. 3A). This location is illustrated by the circled portion in FIG. 4A.

FIG. 4B shows a schematic, perspective view of the circled portion of FIG. 4A. This shows the declustering device arranged within portion 32 the ion guide. The declustering device shown is the same as that of the embodiment in FIG. 1B, although other embodiments of the declustering device may be used. Printed circuit boards 35 may be arranged on opposing sides of the ion guide and declustering device and connected to the electrodes 1,3,34-37 of these components for applying the various voltages to the electrodes.

Figure 5:
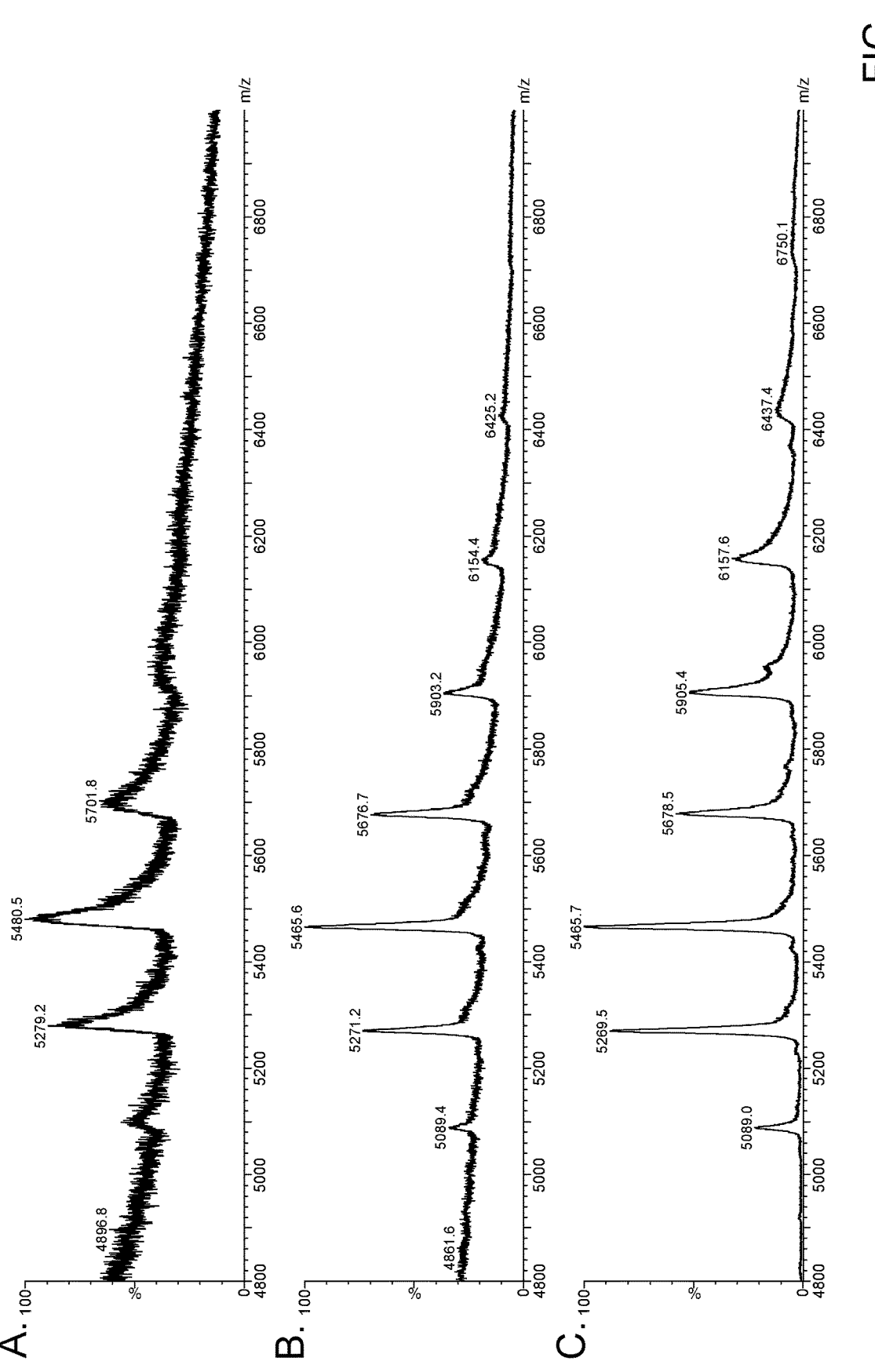
FIGS. 5A-5C show mass spectral data according to both a known declustering technique and a declustering technique according to an embodiment of the present invention.

FIGS. 5A-5C show mass spectral data for the analysis of alcohol dehydrogenase protein complex dissolved to 10 uM in 200 mM ammonium acetate and infused at 5 μL/min via a standard flow electrospray ionisation source on a Q-ToF mass spectrometer. No desalting procedure was used prior to the infusion.

FIG. 5A shows mass spectral data obtained using a Synapt G2-Si mass spectrometer, in which a relatively low voltage of 50V was applied to the sampling cone. This caused the ions to be accelerated through the device at a relatively low rate such that relatively low energy collisions occurred between the clusters and background gas. As can be seen from FIG. 5A, the observed multiply charged peaks are relatively broad due to the ion clusters. FIG. 5B shows mass spectral data obtained using a Synapt G2-Si mass spectrometer, in which a relatively high voltage of 200V was applied to the sampling cone. This caused the ions to be accelerated through the device at a relatively high rate such that relatively high energy collisions occurred between the clusters and background gas, causing declustering of the analyte ions and adduct species. As can be seen from FIG. 5B, the observed mass spectral peaks are relatively narrow and the signal-to-noise ratio has improved, as compared to FIG. 5A.

FIG. 5C shows mass spectral data obtained according to an embodiment of the present invention, in which the relatively low cone voltage of FIG. 5A was used, but a declustering device as described herein was provided. The declustering AC voltage applied to the device had a square waveform, a frequency of 45 kHz and a peak-to-peak voltage of 280V. As can be seen from FIG. 5C, even using a relatively low cone voltage, but with the declustering AC voltage applied, the mass spectral peaks observed have a relatively high definition and signal-to-noise ratio, e.g. as compared to FIG. 5B.

Further experimental data was obtained by mass analysing alcohol dehydrogenase protein complex dissolved to 10 uM in 200 mM ammonium acetate and infused at 5 μL/min via a standard flow electrospray ionisation source. No desalting procedure was used prior to the infusion.

Figure 6A:
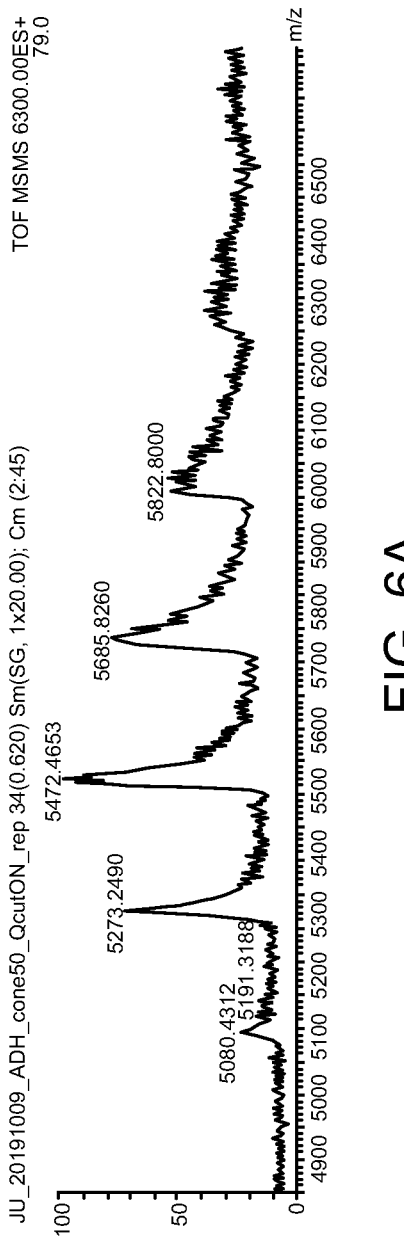
FIGS. 6A-6C also show mass spectral data according to both a known declustering technique and a declustering technique according to an embodiment of the present invention.
Figure 6B:
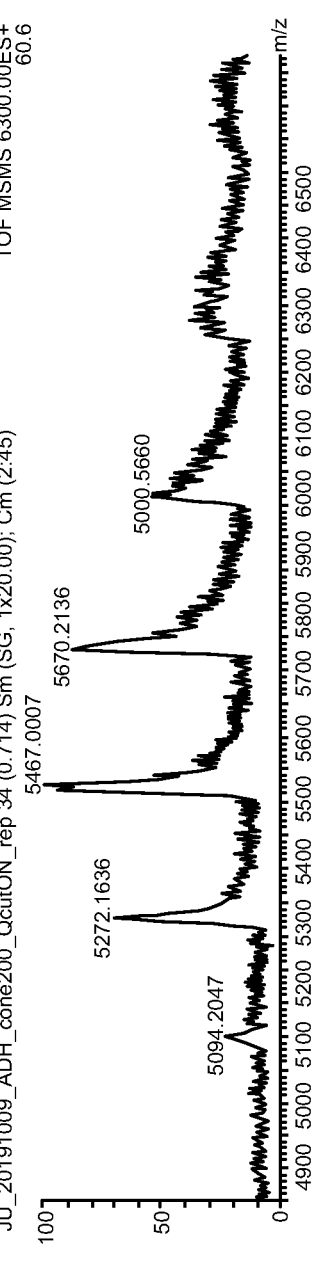
Figure 6C:
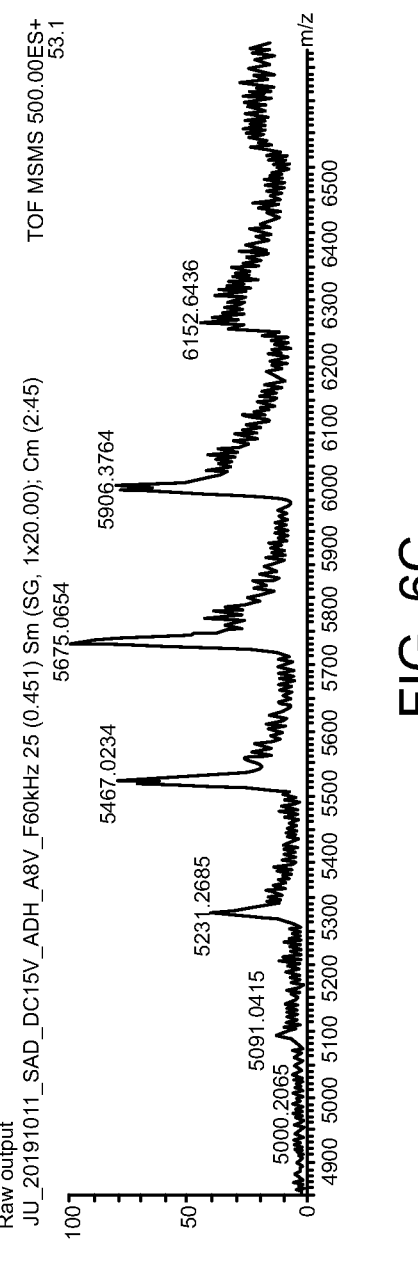

FIGS. 6A-6C show plots of mass spectral data obtained using the known cone voltage declustering technique and obtained using an embodiment of the invention. FIG. 6A shows mass spectral data obtained when a relatively low voltage of 50V was applied to the sampling cone. This caused the ions to be accelerated through the device at a relatively low rate such that relatively low energy collisions occurred between the clusters and background gas. As can be seen from FIG. 6A, the m/z peaks are relatively broad, e.g. the peak closest to m/z=5466 has a FWHM of 35 m/z. FIG. 6B shows mass spectral data obtained when a relatively high voltage of 200V was applied to the sampling cone. This caused the ions to be accelerated through the device at a relatively high rate such that relatively high energy collisions occurred between the clusters and background gas, causing declustering of the analyte ions and adduct species. As can be seen from FIG. 6B, the observed mass spectral peaks are narrower (e.g. the peak closest to m/z=5466 has a FWHM of 18 m/z) and the signal-to-noise ratio has improved. FIG. 6C shows mass spectral data obtained according to an embodiment of the present invention, in which the relatively low cone voltage of 50V was used, but a declustering device as described herein was provided. The declustering AC voltage applied to the device had a substantially sinusoidal waveform, a frequency of 60 kHz and a peak-to-peak voltage of 280V. As can be seen from FIG. 6C, even using a relatively low cone voltage, but with the declustering AC voltage applied, the m/z peaks observed have a high definition (e.g. the peak closest to m/z=5466 has a FWHM of 16 m/z) and signal-to-noise ratio.

Figures 7A, 7B:
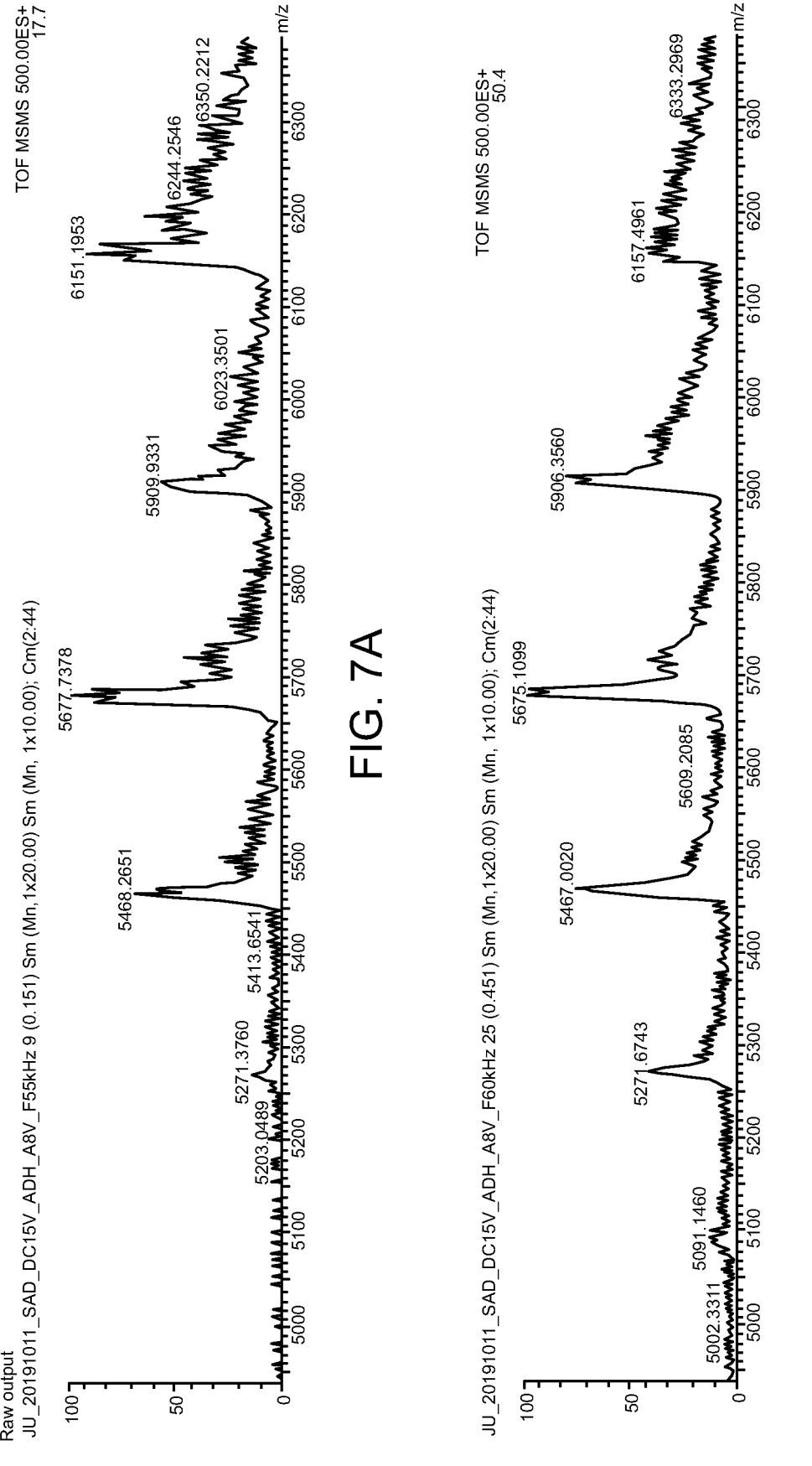
FIGS. 7A-7D show mass spectral data from a declustering technique according to an embodiment of the present invention, wherein the declustering AC voltage has different frequencies.
Figures 7C, 7D:
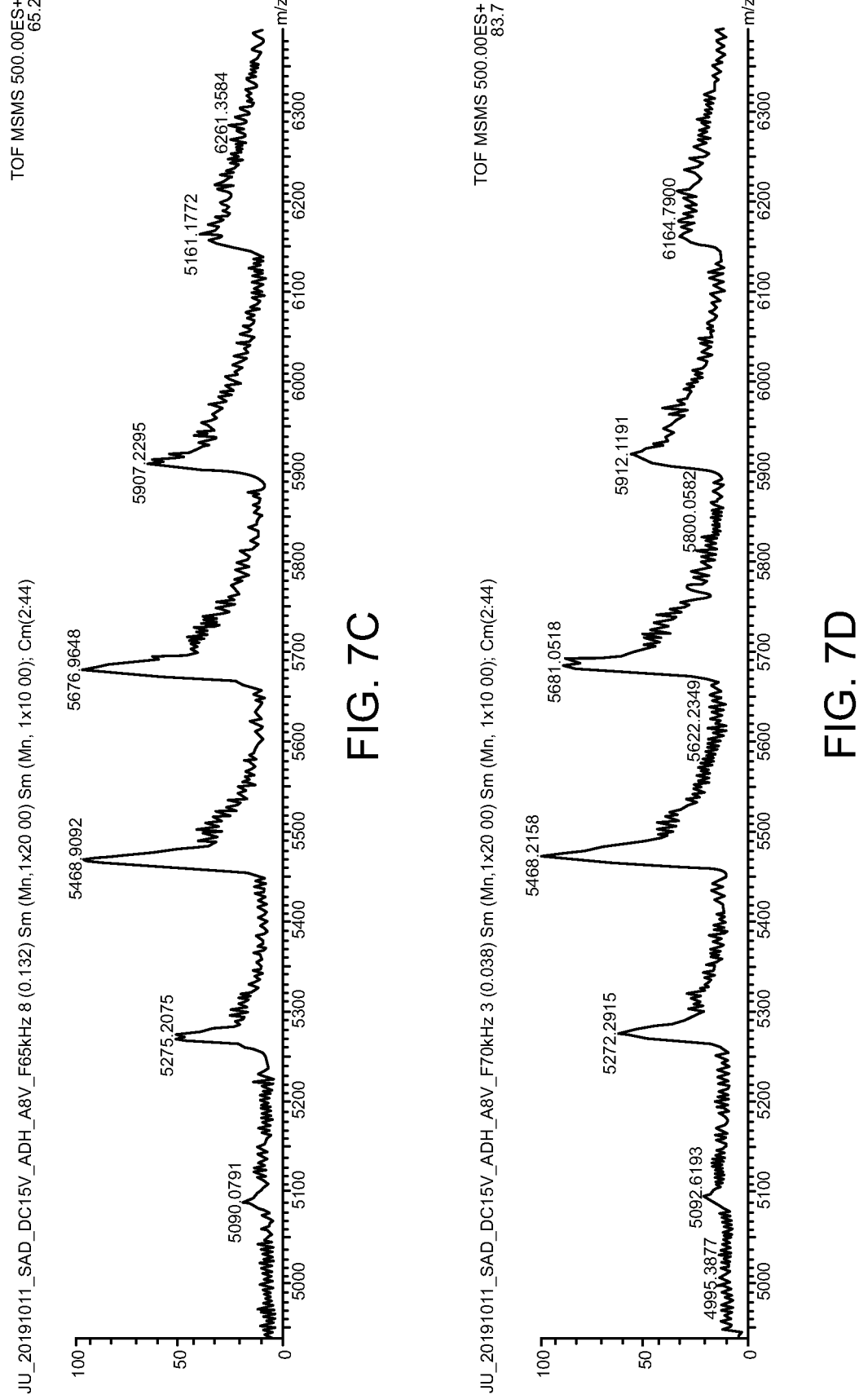

FIGS. 7A-7D show plots of mass spectral data corresponding to that obtained as described in relation to the embodiment in FIG. 6C, except wherein FIG. 7A shows spectral data obtained using a declustering AC voltage having a frequency of 55 kHz, FIG. 7B shows spectral data obtained using a declustering AC voltage having a frequency of 60 kHz, FIG. 7C shows spectral data obtained using a declustering AC voltage having a frequency of 65 kHz, and FIG. 7D shows spectral data obtained using a declustering AC voltage having a frequency of 70 kHz. It can be seen from FIGS. 7A-7D that the width of the peaks observed become smaller as the frequency of the declustering AC voltage is reduced. For example, the peak closest to m/z=5466 has a FWHM of 15 m/z in FIG. 7A, 16 m/z in FIG. 7B, 18 m/z in FIG. 7C, and 23 m/z in FIG. 7D.

Figures 8A, 8B:
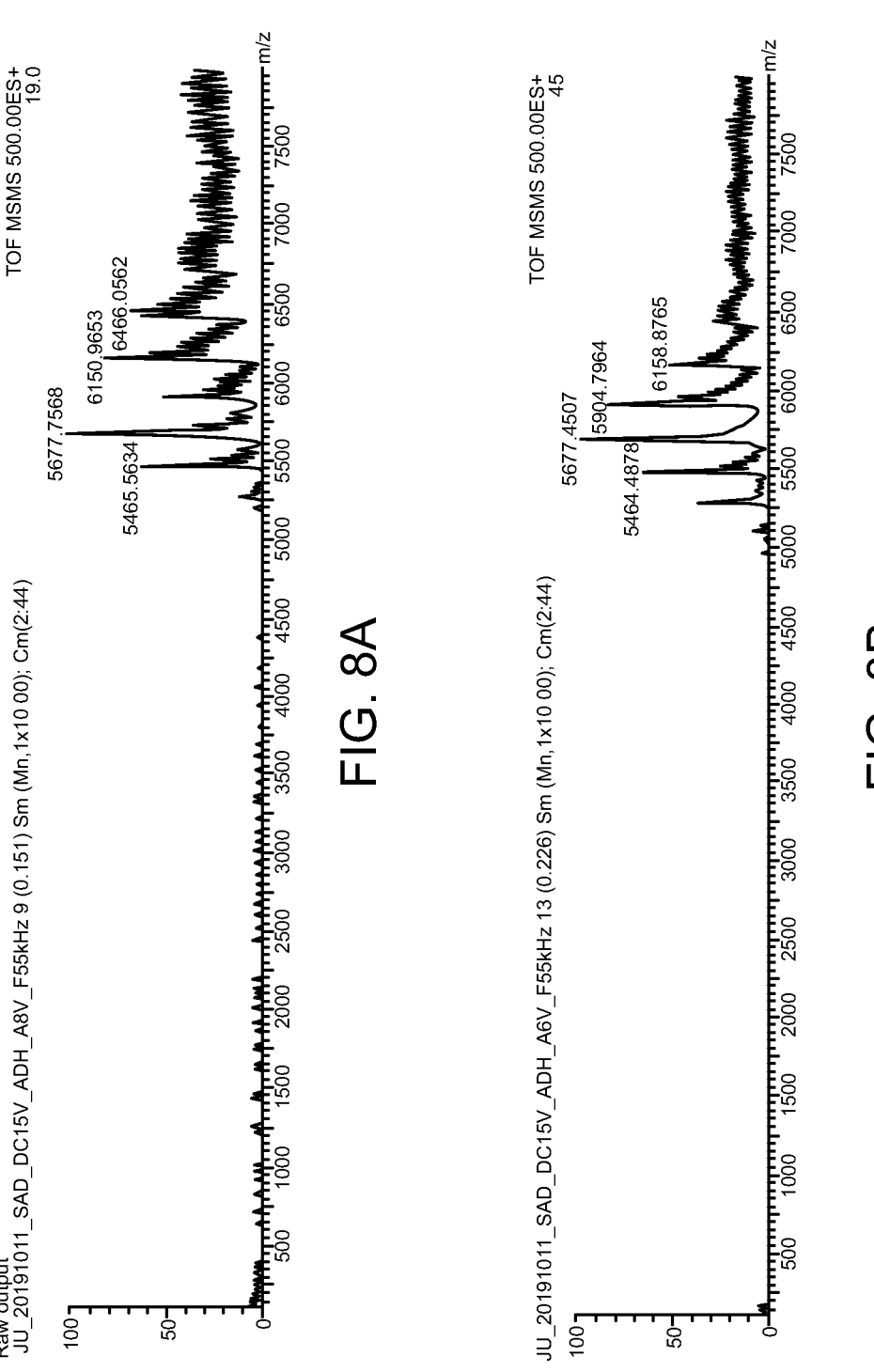
FIGS. 8A-8E show mass spectral data from a declustering technique according to an embodiment of the present invention, wherein the declustering AC voltage has a first frequency and different amplitudes.
Figures 8C, 8D:
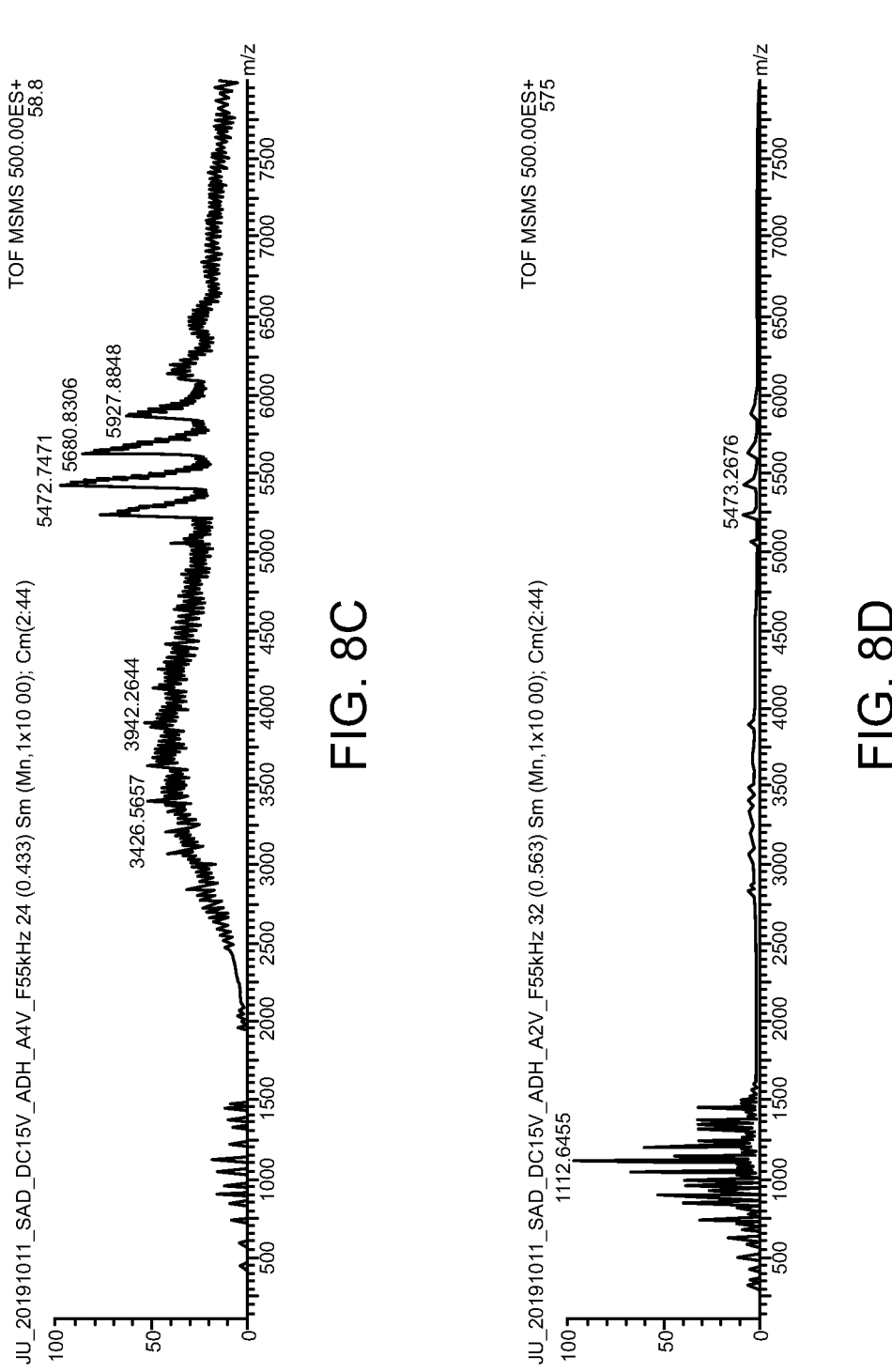
Figure 8E:
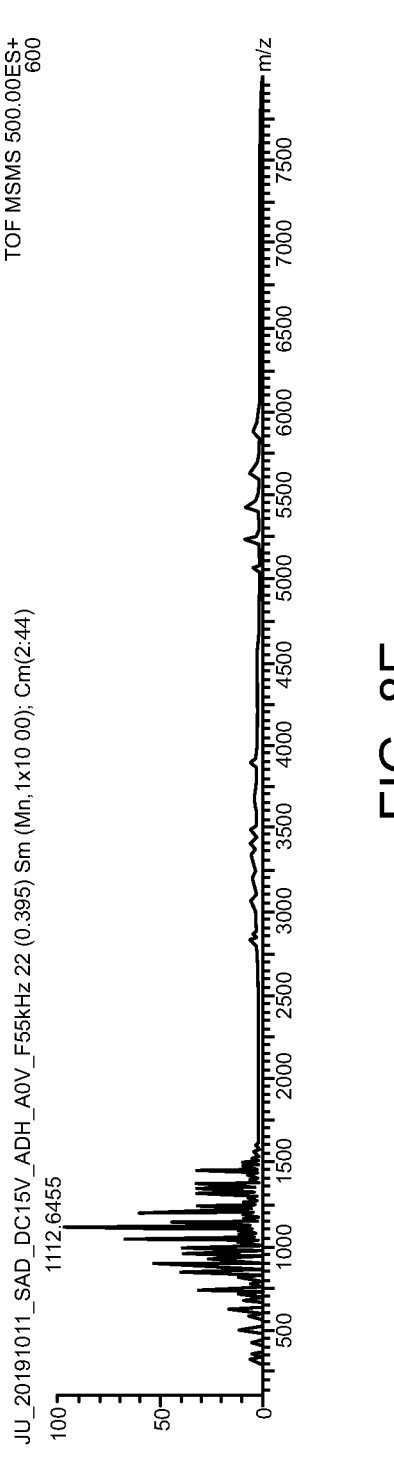

FIGS. 8A-8E show plots of mass spectral data obtained as described in relation to the embodiment in FIG. 6C, except wherein FIGS. 8A-8E show spectral data obtained using a declustering AC voltage having a frequency of 55 kHz, and wherein the peak-to-peak amplitude of the declustering AC voltage is different for each of the different plots of FIGS. 8A-8E. FIG. 8A shows a plot obtained when the declustering AC voltage had a peak-to-peak amplitude of 280V, FIG. 8B shows a plot obtained when the declustering AC voltage had a peak-to-peak amplitude of 260V, FIG. 8C shows a plot obtained when the declustering AC voltage had a peak-to-peak amplitude of 175V, FIG. 8D shows a plot obtained when the declustering AC voltage had a peak-to-peak amplitude of 90V, and FIG. 8E shows a plot obtained when the declustering AC voltage had a peak-to-peak amplitude of 0V.

Figures 9A, 9B, 9C:
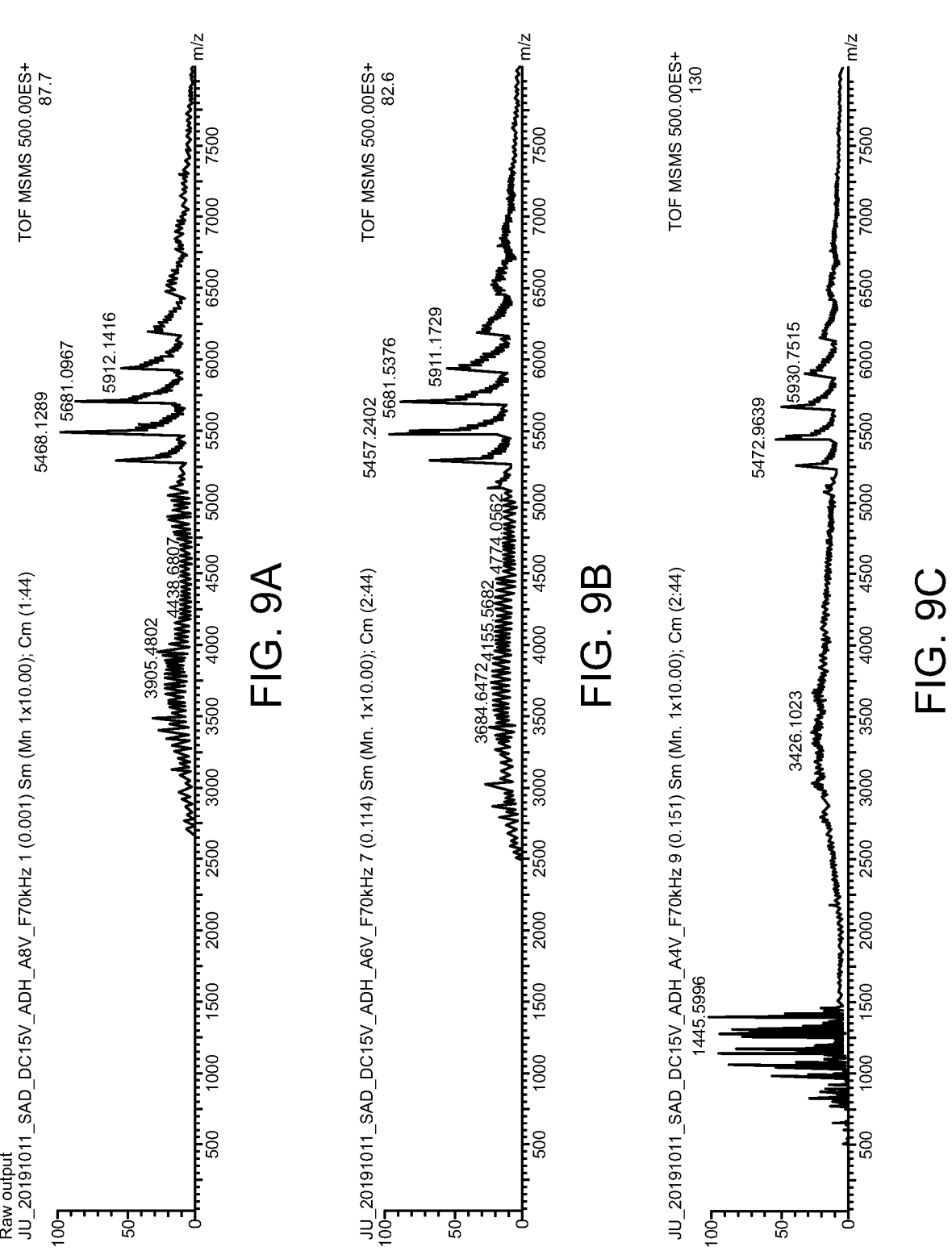
FIGS. 9A-9E show mass spectral data from a declustering technique according to an embodiment of the present invention, wherein the declustering AC voltage has a second frequency and different amplitudes.
Figures 9D, 9E:
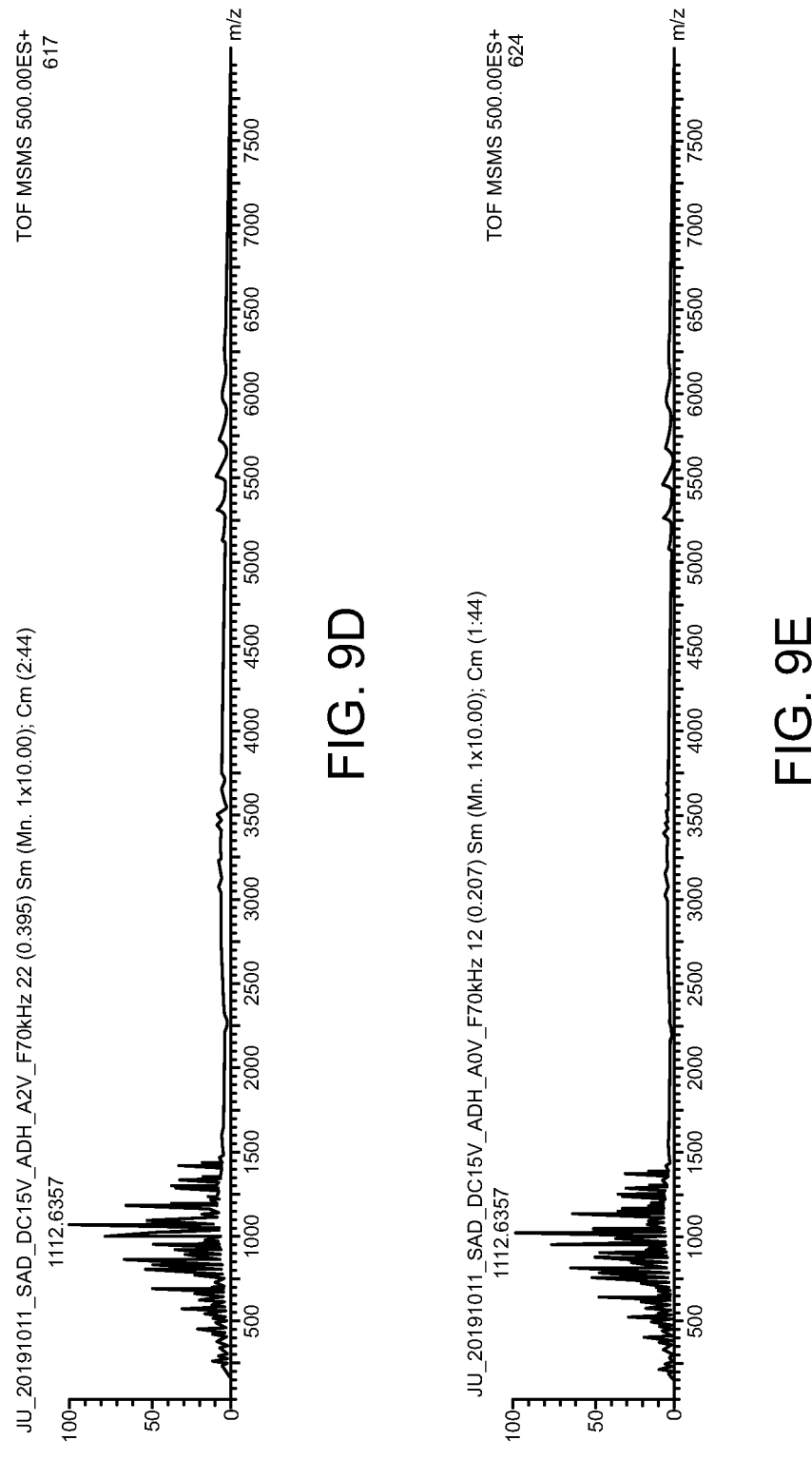

FIGS. 9A-9E show plots of mass spectral data obtained as described in relation to the embodiment in FIG. 6C, except wherein FIGS. 9A-9E show spectral data obtained using a declustering AC voltage having a frequency of 70 kHz, and wherein the peak-to-peak amplitude of the declustering AC voltage is different for each of the different plots of FIGS. 9A-9E. FIG. 9A shows a plot obtained when the declustering AC voltage had a peak-to-peak amplitude of 280V, FIG. 9B shows a plot obtained when the declustering AC voltage had a peak-to-peak amplitude of 260V, FIG. 9C shows a plot obtained when the declustering AC voltage had a peak-to-peak amplitude of 175V, FIG. 9D shows a plot obtained when the declustering AC voltage had a peak-to-peak amplitude of 90V, and FIG. 9E shows a plot obtained when the declustering AC voltage had a peak-to-peak amplitude of 0V.

As can be seen from FIGS. 8A-8E, once the amplitude of the declustering AC voltage has been increased above a certain level the signal to noise ratio for the ions of interest (e.g. the peak nearest to m/z=5466) significantly increases, and the peak width decreases as the amplitude is further increased. The same trends can be observed in FIGS. 9A-9E.

Figure 10:
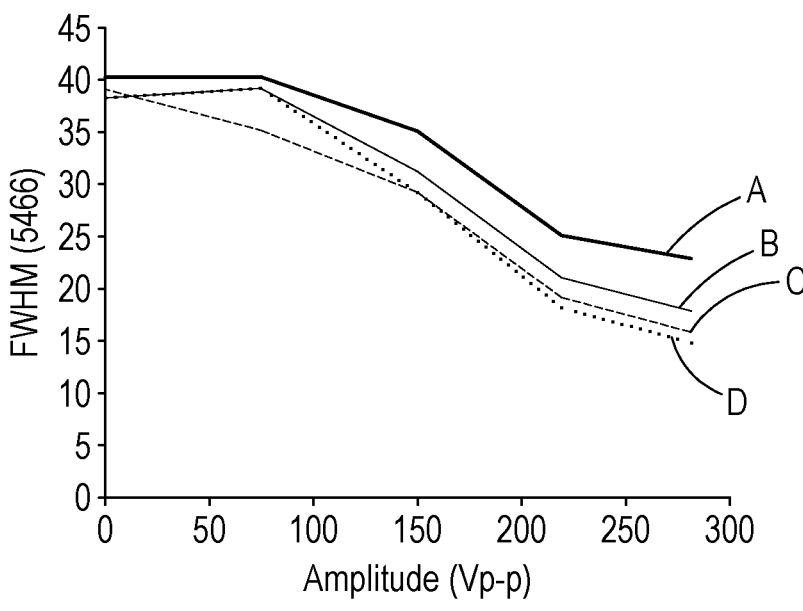
FIG. 10 shows plots of how the FWHM of a m/z peak varies as a function of the declustering AC voltage amplitude, for declustering AC voltages having four different frequencies.

FIG. 10 shows four plots of how the width (FWHM) of the peak closest to m/z=5466 varies as a function of declustering AC voltage amplitude, for four declustering AC voltages having four different frequencies. Plot A is for a declustering AC voltage having a frequency of 70 kHz, plot B is for a declustering AC voltage having a frequency of 65 kHz, plot C is for a declustering AC voltage having a frequency of 60 kHz, and plot D is for a declustering AC voltage having a frequency of 55 kHz.

Figure 11:
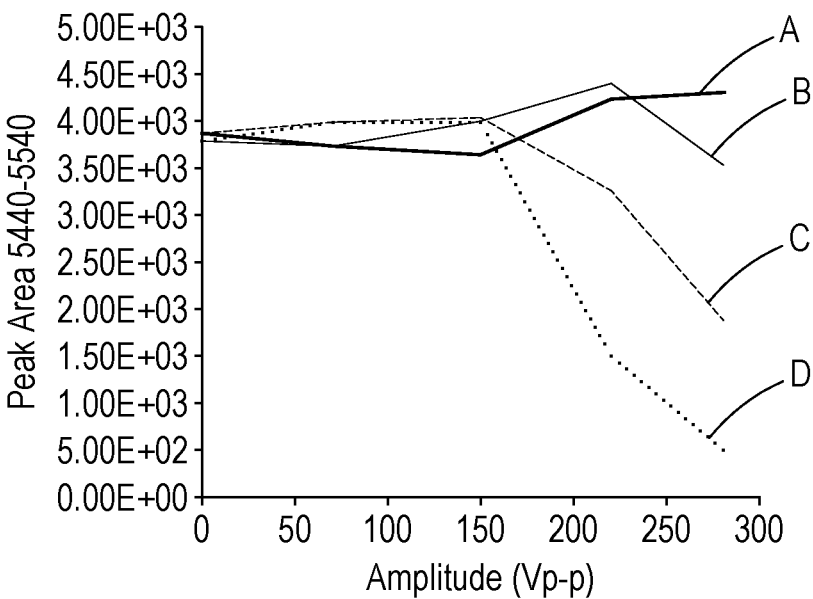
FIG. 11 shows plots of how the peak area of a certain mass range varies as a function of the declustering AC voltage amplitude, for declustering AC voltages having different frequencies.

FIG. 11 shows four plots of how the peak area between m/z=5440 and 5540 varies as a function of declustering AC voltage amplitude, for four declustering AC voltages having four different frequencies. Plot A is for a declustering AC voltage having a frequency of 70 kHz, plot B is for a declustering AC voltage having a frequency of 65 kHz, plot C is for a declustering AC voltage having a frequency of 60 kHz, and plot D is for a declustering AC voltage having a frequency of 55 kHz.

The frequency and amplitude of the declustering AC voltage determine the position of the low-m/z cut off. For maximum "declustering" the low-m/z cut off can be set just above the m/z of ion of interest. This however results in some ion losses. There is no enhancement in transmission, however spectrum quality is improved (lower FWHM).

It can be seen from the above-described Figures that increasing the amplitude of the declustering AC voltage generally increases the signal-to-noise-ratio and reduces the FWHM and area of the peaks. Also, the width of the peaks observed generally becomes smaller as the frequency of the declustering AC voltage is reduced. This is because the declustering AC voltage causes the device to operate as a high-pass filter to some extent. In general, ions having relatively low mass to charge ratio tend to have a relatively high mobility, and so these ions tend to be oscillated by the declustering AC voltage with a greater amplitude than ions having a higher mass to charge ratio. Accordingly, when the declustering AC voltage is set at a frequency and amplitude necessary to decluster ions having a relatively high mass to charge ratio, then this will generally cause ions having lower mass to charge ratios to oscillate with a relatively amplitude and be lost to the electrodes of the declustering device (e.g. by hitting the electrodes to which the declustering AC voltage is applied). This effect can be seen in FIGS. 8 and 9. For example, the group of ions having a relatively low mass to charge ratio around m/z=1000 disappear as the amplitude of the declustering AC voltage is increased. These ions hit upper and lower electrodes 1 of the declustering device and are not transmitted through the device. As the declustering AC voltage is increased further (e.g. from FIG. 8C to 8B), the group of ions having a mass to charge ratio around m/z=3500 disappear, leaving only ions of interest having a mass to charge ratio around m/z=5500. However, if the amplitude of the declustering AC voltage is increased too far then some ions of interest may be lost, such as in FIG. 8A in which ions having a mass to charge ratio around m/z=5500 are lost. Similarly, varying the frequency of the declustering AC voltage alters the ions that are transmitted by the declustering device.

Therefore, it may be desired to vary the amplitude and/or frequency of the declustering AC voltage in order to optimise the declustering and/or transmission of ions of interest.

For example, the amplitude and/or frequency of the declustering AC voltage may be varied with time. In these embodiments, the clusters may be separated by mass to charge ratio or ion mobility prior to transmitting the clusters into the declustering device, and the amplitude and/or frequency of the declustering AC voltage may be varied with time based on the mass to charge ratio or ion mobility of the clusters being transmitted into the declustering device. For example, the clusters may be separated by scanning/stepping a mass filter (e.g. quadrupole mass filter), mass selective ion trap or other separator device so as to transmit ions having different mass to charge ratios to the declustering device at different times. The separator may be scanned/stepped in this manner over a time period and the variation of the declustering AC voltage may be synchronised with this time period such that clusters having different mass to charge ratios experience different AC amplitudes and/or frequencies in the declustering device. Similarly, the clusters may be separated by an ion mobility separator so as to transmit ions having different mobilities to the declustering device at different times. The separator may separate the ions over a time period and the variation of the declustering AC voltage may be synchronised with this time period such that clusters having different mobilities experience different AC amplitudes and/or frequencies in the declustering device.

Alternatively, or additionally, a plurality of different declustering AC voltages having different amplitudes and/or frequencies may be applied at different axial locations along the length of the declustering device. The declustering AC voltages applied at progressively more downstream axial locations of the declustering device may have progressively lower amplitudes. This is beneficial since as clusters move along the declustering device and shed adduct ions their mobility tends to increase, and so reducing the amplitude of the declustering AC voltages along the declustering device helps prevent these ions oscillating with large amplitudes that will cause them to be lost to electrodes of the declustering device. The different declustering AC voltages may (alternatively or additionally) have different frequencies for the same purpose.

A mass filter, such as a resolving quadrupole mass filter, may be provided downstream of the declustering device. The mass filter has a mass to charge ratio transmission window and ions having mass to charge ratios within this window are transmitted, whereas ions having mass to charge ratios outside of this window are not transmitted and are filtered out by the mass filter. The window may be scanned with time such that the mass filter is (only) capable of transmitting different mass to charge ratios at different times. The amplitude and/or frequency of the declustering AC voltage that is applied to the declustering device may be varied with time, together with the mass to charge ratio transmission window of the mass filter. For example, the amplitude and/or frequency of the declustering AC voltage may be varied in synchronism with the mass to charge ratio transmission window of the mass filter, e.g. in order to only transmit ions that have been declustered by a relatively high amount. An example of this will be described in relation to FIGS. 12A-12D.

Figure 12A:
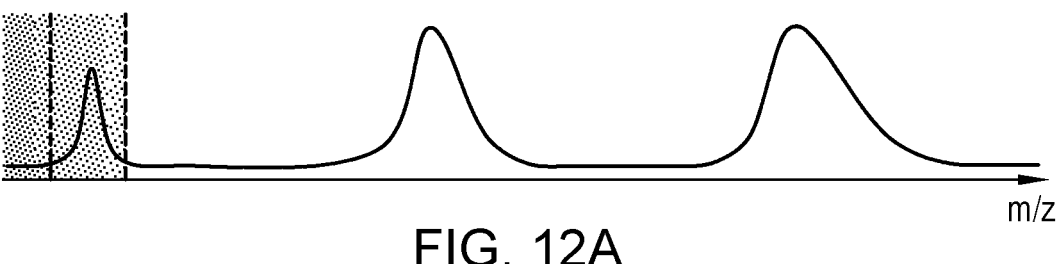
FIGS. 12A-12D show mass spectral data according to an embodiment in which a mass filter is scanned in synchronism with the amplitude of the declustering AC voltage.
Figure 12B:
Figure 12C:
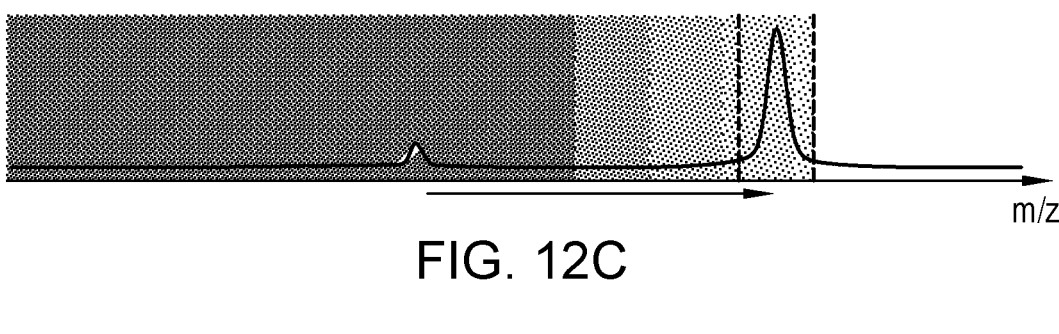

FIGS. 12A-12C show schematic plots of how a mass spectrum may change as the amplitude of the declustering AC voltage is increased. FIG. 12A shows a mass spectrum obtained using a relatively low amplitude declustering AC voltage on the declustering device. Ions represented by the peak of the lowest mass to charge ratio have been relatively well declustered, which is shown by the peak being relatively narrow. However, the two higher m/z peaks are relatively wide, due to relatively poor declustering of those ions. FIG. 12B shows a mass spectrum obtained using a higher amplitude declustering AC voltage on the declustering device. The intensity of the lowest m/z peak has been significantly reduced, due to the increased amplitude of the declustering AC voltage having resulted in the low-mass cut-off of the declustering device being increased, due to the reasons described above (i.e. the lower m/z ions are oscillated to higher amplitudes by the increased amplitude of the declustering AC voltage and so are lost to the electrodes). The ions represented by the two higher m/z peaks have been declustered to a greater extent, which is why these two peaks are narrower than in FIG. 12A. It can be seen that the middle m/z peak in FIG. 12B is relatively well declustered and narrow, whereas the highest m/z peak is still relatively broad and not well declustered. FIG. 12C shows a mass spectrum obtained using a higher amplitude declustering AC voltage than in FIG. 12B. The lowest m/z peak has disappeared and the intensity of the middle m/z peak has been significantly reduced, due to the increased amplitude of the declustering AC voltage having resulted in the low-mass cut-off of the declustering device being increased. The ions represented by the highest m/z peak have been declustered to a relatively high extent, which is why this peak is narrower than in FIGS. 12A and 12B. Alternatively, or additionally, the frequency of the declustering AC voltage may be varied with time so as to achieve this.

As described above, a mass filter may be provided downstream of the declustering device having a mass to charge ratio transmission window that is scanned in synchronism with the amplitude (and/or frequency) of the declustering AC voltage that is applied to the declustering device. The mass filter may be scanned in synchronism with the declustering AC voltage so that substantially only declustered ions are transmitted downstream by the mass filter. The upper and lower limits of the mass to charge ratio transmission window are shown as vertical dashed lines in FIGS. 12A-12C. As can be seen from FIG. 12A, at a first time when the declustering AC voltage has a first (low) amplitude, the mass to charge ratio transmission window of the mass filter is set so as to transmit ions having a first (low) range of mass to charge ratios. As such, only the highly declustered ions represented by the lowest m/z peak in FIG. 12A are transmitted. As can be seen from FIG. 12B, at a second time when the declustering AC voltage has a higher (medium) amplitude, the mass to charge ratio transmission window of the mass filter is set so as to transmit ions having a higher (medium) range of mass to charge ratios. As such, only the highly declustered ions represented by the middle m/z peak in FIG. 12B are transmitted. As can be seen from FIG. 12C, at a third time when the declustering AC voltage has a higher (highest) amplitude, the mass to charge ratio transmission window of the mass filter is set so as to transmit ions having a higher (highest) range of mass to charge ratios. As such, only the highly declustered ions represented by the highest m/z peak in FIG. 12C are transmitted.

Figure 12D:
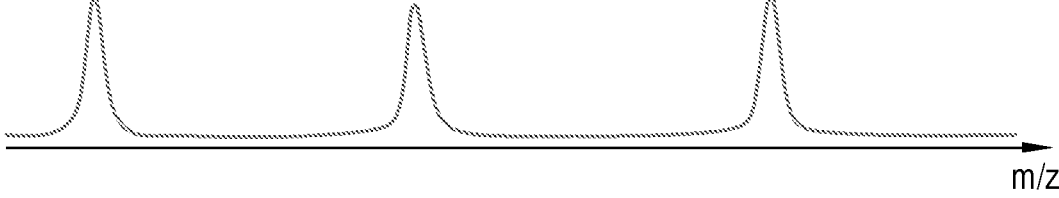

FIG. 12D shows the combined mass spectrum obtained by scanning the mass filter in this manner. It can be seen by comparing FIG. 12D with FIG. 12A that this significantly reduces the widths of the m/z peaks and provides higher resolution mass spectral data.

Removing adduct ions removes low m/z ions and so reduces the amount of charge entering the mass analyser, which reduces potential detrimental space-charge effects in the instrument.

Although the present invention has been described with reference to preferred embodiments, it will be understood by those skilled in the art that various changes in form and detail may be made without departing from the scope of the invention as set forth in the accompanying claims.

For example, although the declustering AC voltage has been described above as having a substantially square or sinusoidal waveform, it is contemplated that it may have a waveform of any other shape, such as triangular. Desirably, the peak positive and peak negative amplitudes of the waveform are the same, i.e. the waveform is symmetric, although it is contemplated that these peak amplitudes could be different and the waveform may be asymmetric.

The declustering device described herein may be provided in an atmospheric pressure region or vacuum chamber and utilise the background gas therein for providing the collisions during the declustering mode. Alternatively, the declustering device may be provided in a gas cell (e.g. its own dedicated gas cell) and the gas pressure and/or gas composition in that gas cell may be controlled, e.g. so as to be optimised for the declustering and/or non-declustering modes. The gas cell may be maintained with different gas pressures and/or gas compositions in the two different modes.

Although the declustering device has been described as being part of or immediately downstream of the ion source, it is contemplated that it may be arranged at other downstream locations in the spectrometer.

The invention claimed is:

1. A method of mass and/or ion mobility spectrometry comprising:
 providing an ion guide comprising a plurality of electrodes and having a background gas therein;
 applying an RF voltage to electrodes of the ion guide for radially confining ions therein;
 transmitting clusters of analyte ions and adduct species into the ion guide;
 applying, in a first mode, one or more AC voltage to the ion guide so as to oscillate the clusters such that they collide with molecules of the background gas and cause adduct species in the clusters to detach from the analyte ions, wherein the one or more AC voltage has a different amplitude and/or frequency to that of said RF voltage; and
 (i) varying the speed with which the clusters are urged along the ion guide during the first mode; and/or
 (ii) varying the amplitude and/or frequency of the one or more AC voltage as the clusters travel along the ion guide.

2. The method of claim 1, wherein the amplitude and/or frequency of the one or more AC voltage is varied with time.

3. The method of claim 2, comprising transmitting ions from the ion guide into a mass filter and mass filtering the ions in the mass filter; wherein the mass to charge ratio, or range of mass to charge ratios, that is selectively transmitted by the mass filter is varied with time in synchronism with the variation of the amplitude and/or frequency of the one or more AC voltage with time; or
 transmitting ions from the ion guide into a mobility filter and mobility filtering the ions in the mobility filter; wherein the mobility, or range of mobilities, that is selectively transmitted by the mobility filter is varied with time in synchronism with the variation of the amplitude and/or frequency of the one or more AC voltage with time.

4. The method of claim 2, comprising mass analysing ions from the ion guide in a mass analyser; wherein operation of the mass analyser is varied with time so as to vary the mass to charge ratio, or range of mass to charge ratios, that the mass analyser is capable of analysing or is optimised to analyse; and wherein this mass to charge ratio, or range of mass to charge ratios, is varied with time in synchronism with the variation of the amplitude and/or frequency of the one or more AC voltage.

5. The method of claim 2, comprising separating the clusters by mass to charge ratio or ion mobility prior to transmitting the clusters into the ion guide, and varying the amplitude and/or frequency of the one or more AC voltage with time based on the mass to charge ratio or ion mobility of the clusters being transmitted into the ion guide.

6. The method of claim 1, wherein said one or more AC voltage is a plurality of different AC voltages having different amplitudes and/or frequencies, and wherein the different AC voltages are applied at different axial locations along the length of the ion guide.

7. The method of claim 6, wherein the AC voltages applied at progressively more downstream axial locations of the ion guide have progressively lower amplitudes.

8. The method of claim 1, wherein the electrodes of the ion guide define a conduit through which the clusters are guided, wherein the RF voltage applied to the electrodes radially confines the ions and urges them towards a central axis through the conduit, and wherein the AC voltage causes the clusters to oscillate about the central axis, in the first mode.

9. The method of claim 1, wherein the step of varying the speed with which clusters are urged along the ion guide comprises repeatedly travelling a transient DC voltage along the ion guide so as to urge the clusters along the ion guide; and wherein the amplitude of the transient DC voltage, and/or the speed and/or frequency with which the transient DC voltage moves along the ion guide, is varied with time so as to vary the speed with which the clusters are urged along the ion guide in the first mode.

10. The method of claim 1, wherein the step of varying the speed with which clusters are urged along the ion guide comprises generating an axial electric field along the ion guide by simultaneously applying different DC voltages to different electrodes of the ion guide, and varying the different voltages so as to vary the magnitude of the electric field and hence vary the speed with which the clusters are urged along the ion guide in the first mode.

11. The method of claim 1, wherein during the first mode the background gas is maintained at a pressure between 0.01 and 10 millibar.

12. The method of claim 1, comprising operating the ion guide in a second mode in which said one or more AC voltage is not applied to the ion guide.

13. The method of claim 12, comprising switching between the first and second modes whilst said clusters are passing through the ion guide.

14. The method of claim 1, comprising ionising an analyte solution so as to produce said clusters, wherein the analyte solution comprises a membrane protein dissolved in a solvent using a detergent, and wherein the analyte ion in the cluster is a membrane protein ion and the adduct species in the cluster is a detergent molecule.

15. The method of claim 1, comprising mass analysing and/or ion mobility analysing the analyte ions and any remaining clusters downstream of the ion guide so as to obtain mass and/or mobility peaks, respectively, of the analyte ions and remaining clusters; and determining the width and/or signal-to-noise ratio of one or more of the peaks and varying the frequency and/or amplitude of the one or more AC voltage during the first mode so as to alter the width and/or signal-to-noise ratio of peaks for subsequently analysed analyte ions and clusters.

16. The method of claim 1, wherein the method is performed on a mass or mobility spectrometer comprising: a first vacuum chamber having an inlet aperture; a second vacuum chamber adjacent the first vacuum chamber; and a differential pumping aperture separating the first and second vacuum chambers; wherein said ion guide is arranged in the first vacuum chamber.

17. The method of claim 16, wherein the first vacuum chamber comprises an ion guiding device having a first portion that guides ions along a first axial path, a second portion that guides ions along a second different axial path, and a transition portion that urges ions from the first axial path onto the second axial path, and wherein said ion guide is part of, or downstream of, said ion guiding device.

18. A mass or mobility spectrometer comprising:
an ion guide comprising a plurality of electrodes and a background gas therein;
an RF voltage supply for applying an RF voltage to electrodes of the ion guide for radially confining ions therein;
one or more AC voltage supply for applying, in a first mode, one or more AC voltage to the ion guide so as to oscillate clusters of analyte ions and adduct species such that they collide with molecules of the background gas and cause adduct species in the clusters to detach from the analyte ions, wherein the AC voltage has a different amplitude and/or frequency to that of said RF voltage; and
control circuitry configured to control the spectrometer so as to:
(i) vary the speed with which the clusters are urged along the ion guide during the first mode; and/or
(ii) vary the amplitude and/or frequency of the one or more AC voltage as the clusters travel along the ion guide.

19. The spectrometer of claim 18, comprising a DC voltage supply connected to electrodes of the ion guide, wherein the control circuitry controls the DC voltage supply to successively apply a DC voltage to different ones of the electrodes so as to repeatedly travel a transient DC voltage along the ion guide; wherein the amplitude of the transient DC voltage, and/or the speed and/or frequency with which the transient DC voltage moves along the ion guide, is varied with time for varying the speed with which the clusters are urged along the ion guide.

20. The spectrometer of claim 18, comprising a DC voltage supply connected to electrodes of the ion guide, wherein the control circuitry controls the DC voltage supply to simultaneously apply different DC voltages to different ones of the electrodes for generating an axial electric field along the ion guide, and vary the different voltages with time so as to vary the magnitude of the electric field for varying the speed with which the clusters are urged along the ion guide.

\* \* \* \* \*